US012332379B2

(12) United States Patent
Pennecot et al.

(10) Patent No.: US 12,332,379 B2
(45) Date of Patent: Jun. 17, 2025

(54) VEHICLE WITH MULTIPLE LIGHT DETECTION AND RANGING DEVICES (LIDARS)

(71) Applicant: Waymo LLC, Mountain View, CA (US)

(72) Inventors: Gaetan Pennecot, San Francisco, CA (US); Zachary Morriss, San Francisco, CA (US); Samuel Lenius, Sunnyvale, CA (US); Dorel Ionut Iordache, Pleasanton, CA (US); Daniel Gruver, San Francisco, CA (US); Pierre-Yves Droz, Los Altos, CA (US); Luke Wachter, San Francisco, CA (US); Drew Ulrich, San Francisco, CA (US); William Mccann, San Francisco, CA (US); Rahim Pardhan, San Francisco, CA (US); Bernard Fidric, Cupertino, CA (US); Anthony Levandowski, Palo Alto, CA (US); Peter Avram, Sunnyvale, CA (US)

(73) Assignee: Waymo LLC, Mountain View, CA (US)

( * ) Notice: Subject to any disclaimer, the term of this patent is extended or adjusted under 35 U.S.C. 154(b) by 1137 days.

(21) Appl. No.: 17/194,447

(22) Filed: Mar. 8, 2021

(65) Prior Publication Data

US 2021/0278503 A1    Sep. 9, 2021

Related U.S. Application Data

(63) Continuation of application No. 15/715,802, filed on Sep. 26, 2017, now Pat. No. 10,976,437, which is a
(Continued)

(51) Int. Cl.
    *G01S 7/48*      (2006.01)
    *G01C 3/02*      (2006.01)
    (Continued)

(52) U.S. Cl.
    CPC .............. *G01S 7/4808* (2013.01); *G01C 3/02* (2013.01); *G01S 7/4813* (2013.01);
    (Continued)

(58) Field of Classification Search
    USPC ....................................... 356/4.01
    See application file for complete search history.

(56) References Cited

U.S. PATENT DOCUMENTS 6,260,309 B1    7/2001    Cliffton
6,922,251 B1    7/2005    Kirchhoff et al.
(Continued)

FOREIGN PATENT DOCUMENTS

CN      1160858 A    10/1997
CN    101153795 A    4/2008
(Continued)

OTHER PUBLICATIONS

"Extended European Search Report for EP Application No. 16769254.0 dated Mar. 20, 2018", 7 pages.
(Continued)

*Primary Examiner* — James R Hulka
(74) *Attorney, Agent, or Firm* — Botos Churchill IP Law

(57) ABSTRACT

A vehicle is provided that includes one or more wheels positioned at a bottom side of the vehicle. The vehicle also includes a first light detection and ranging device (LIDAR) positioned at a top side of the vehicle opposite to the bottom side. The first LIDAR is configured to scan an environment around the vehicle based on rotation of the first LIDAR about an axis. The first LIDAR has a first resolution. The vehicle also includes a second LIDAR configured to scan a
(Continued)

field-of-view of the environment that extends away from the vehicle along a viewing direction of the second LIDAR. The second LIDAR has a second resolution. The vehicle also includes a controller configured to operate the vehicle based on the scans of the environment by the first LIDAR and the second LIDAR.

23 Claims, 19 Drawing Sheets

Related U.S. Application Data continuation of application No. 15/714,326, filed on Sep. 25, 2017, now Pat. No. 10,120,079, which is a continuation of application No. 15/493,066, filed on Apr. 20, 2017, now Pat. No. 9,864,063, which is a continuation of application No. 15/455,009, filed on Mar. 9, 2017, now Pat. No. 9,778,364, which is a continuation of application No. 14/668,452, filed on Mar. 25, 2015, now Pat. No. 9,625,582.

(51) Int. Cl.
| | | |
|---|---|---|
| *G01S 7/481* | (2006.01) | |
| *G01S 17/10* | (2020.01) | |
| *G01S 17/42* | (2006.01) | |
| *G01S 17/66* | (2006.01) | |
| *G01S 17/87* | (2020.01) | |
| *G01S 17/89* | (2020.01) | |
| *G01S 17/93* | (2020.01) | |
| *G01S 17/931* | (2020.01) | |
| *G01S 17/86* | (2020.01) | |

(52) U.S. Cl.
CPC .......... *G01S 7/4815* (2013.01); *G01S 7/4816* (2013.01); *G01S 7/4817* (2013.01); *G01S 17/10* (2013.01); *G01S 17/42* (2013.01); *G01S 17/66* (2013.01); *G01S 17/87* (2013.01); *G01S 17/89* (2013.01); *G01S 17/93* (2013.01); *G01S 17/931* (2020.01); *G01S 17/86* (2020.01)

(56) References Cited

U.S. PATENT DOCUMENTS

| | | | |
|---|---|---|---|
| 7,564,538 B2* | 7/2009 | Sakimura | G01S 7/4817 356/4.01 |
| 7,626,690 B2 | 12/2009 | Kumagai et al. | |
| 7,969,558 B2 | 6/2011 | Hall | |
| 8,027,029 B2 | 9/2011 | Lu et al. | |
| 8,050,863 B2* | 11/2011 | Trepagnier | B60W 30/00 340/436 |
| 8,072,581 B1 | 12/2011 | Breiholz | |
| 8,139,109 B2* | 3/2012 | Schmiedel | H04N 13/243 348/148 |
| 8,165,796 B2* | 4/2012 | Hoetzer | B60W 30/09 701/301 |
| 8,332,134 B2* | 12/2012 | Zhang | G01S 17/86 701/301 |
| 8,385,683 B2* | 2/2013 | Lin | G01C 15/002 382/284 |
| 8,600,606 B2* | 12/2013 | Nickolaou | B60W 50/0098 367/87 |
| 8,686,899 B2 | 4/2014 | Jakab et al. | |
| 8,743,923 B2* | 6/2014 | Geske | G01S 7/4815 372/50.12 |
| 8,767,190 B2* | 7/2014 | Hall | G01S 17/89 356/9 |
| 8,836,922 B1 | 9/2014 | Pennecot et al. | |
| 8,947,531 B2* | 2/2015 | Fischer | G01S 7/003 348/148 |
| 8,965,677 B2* | 2/2015 | Breed | G08G 1/163 701/301 |
| 8,983,705 B2* | 3/2015 | Zhu | G01W 1/02 701/23 |
| 9,025,140 B2* | 5/2015 | Zhu | G01S 17/66 356/3.01 |
| 9,041,915 B2 | 5/2015 | Earhart et al. | |
| 9,046,599 B2* | 6/2015 | Morikawa | G01S 17/87 |
| 9,063,549 B1 | 6/2015 | Pennecot et al. | |
| 9,065,254 B2 | 6/2015 | Geske et al. | |
| 9,069,080 B2* | 6/2015 | Stettner | B60W 30/08 |
| 9,086,481 B1 | 7/2015 | Dowdall et al. | |
| 9,097,800 B1 | 8/2015 | Zhu | |
| 9,128,190 B1 | 9/2015 | Ulrich et al. | |
| 9,145,140 B2* | 9/2015 | Ferguson | G05D 1/0231 |
| 9,164,511 B1 | 10/2015 | Ferguson et al. | |
| 9,194,949 B2* | 11/2015 | Becker | G01S 13/89 |
| 9,207,323 B2* | 12/2015 | Zhu | G01S 17/86 |
| 9,234,618 B1 | 1/2016 | Zhu et al. | |
| 9,234,964 B2* | 1/2016 | Mheen | G01S 7/4818 |
| 9,285,464 B2* | 3/2016 | Pennecot | G01S 17/42 |
| 9,329,269 B2* | 5/2016 | Zeng | G01S 17/58 |
| 9,378,554 B2 | 6/2016 | Chang et al. | |
| 9,383,753 B1 | 7/2016 | Templeton et al. | |
| 9,495,875 B2* | 11/2016 | Dowdall | B60R 21/013 |
| 9,618,610 B2 | 4/2017 | Kao et al. | |
| 9,625,582 B2 | 4/2017 | Gruver et al. | |
| 9,743,065 B2* | 8/2017 | Kang | H04N 13/133 |
| 9,760,092 B2* | 9/2017 | Ferguson | G06V 20/56 |
| 9,778,364 B2 | 10/2017 | Gruver et al. | |
| 9,831,630 B2* | 11/2017 | Lipson | G01S 7/4815 |
| 9,864,063 B2 | 1/2018 | Gruver et al. | |
| 9,886,636 B2* | 2/2018 | Zhang | G06T 3/4038 |
| 9,945,950 B2* | 4/2018 | Newman | G01S 17/89 |
| 10,120,079 B2 | 11/2018 | Pennecot et al. | |
| 10,203,399 B2* | 2/2019 | Retterath | G01S 17/10 |
| 10,976,437 B2 | 4/2021 | Pennecot et al. | |
| 2007/0291130 A1 | 12/2007 | Broggi et al. | |
| 2008/0059015 A1 | 3/2008 | Whittaker et al. | |
| 2008/0074637 A1 | 3/2008 | Kumagai et al. | |
| 2008/0074638 A1 | 3/2008 | Sakimura et al. | |
| 2009/0079839 A1 | 3/2009 | Fischer et al. | |
| 2010/0020306 A1 | 1/2010 | Hall | |
| 2010/0063736 A1 | 3/2010 | Hoetzer | |
| 2010/0121577 A1 | 5/2010 | Zhang et al. | |
| 2010/0328644 A1* | 12/2010 | Lu | H04N 5/33 356/5.01 |
| 2011/0097014 A1 | 4/2011 | Lin | |
| 2011/0196568 A1 | 8/2011 | Nickolaou et al. | |
| 2011/0216304 A1 | 9/2011 | Hall | |
| 2011/0304842 A1 | 12/2011 | Kao et al. | |
| 2012/0044476 A1 | 2/2012 | Earhart et al. | |
| 2012/0050104 A1* | 3/2012 | Jakab | G01S 19/34 342/357.75 |
| 2012/0092645 A1 | 4/2012 | Inokuchi | |
| 2012/0323474 A1 | 12/2012 | Breed et al. | |
| 2013/0103298 A1 | 4/2013 | Becker et al. | |
| 2013/0194787 A1 | 8/2013 | Geske et al. | |
| 2013/0242285 A1 | 9/2013 | Zeng | |
| 2013/0245877 A1 | 9/2013 | Ferguson et al. | |
| 2013/0253754 A1 | 9/2013 | Ferguson et al. | |
| 2014/0062759 A1 | 3/2014 | Morikawa et al. | |
| 2014/0211194 A1 | 7/2014 | Pacala et al. | |
| 2014/0240691 A1 | 8/2014 | Mheen et al. | |
| 2014/0269796 A1* | 9/2014 | Geske | H01S 5/4087 372/34 |
| 2014/0288817 A1 | 9/2014 | Dowdall et al. | |
| 2014/0307247 A1 | 10/2014 | Zhu et al. | |
| 2014/0324266 A1 | 10/2014 | Zhu et al. | |
| 2014/0333468 A1 | 11/2014 | Zhu et al. | |
| 2014/0347470 A1 | 11/2014 | Zhang et al. | |
| 2014/0350836 A1 | 11/2014 | Stettner et al. | |
| 2015/0055117 A1 | 2/2015 | Pennecot et al. | |
| 2015/0092018 A1 | 4/2015 | Kang et al. | |
| 2015/0131080 A1 | 5/2015 | Retterath et al. | |
| 2015/0219764 A1 | 8/2015 | Lipson | |
| 2015/0331111 A1 | 11/2015 | Newman et al. | |
| 2015/0375753 A1 | 12/2015 | Schräbler et al. | |
| 2016/0104289 A1 | 4/2016 | Chang et al. | |

(56) References Cited

U.S. PATENT DOCUMENTS

| | | |
|---|---|---|
| 2016/0282468 A1 | 9/2016 | Gruver et al. |
| 2016/0307447 A1 | 10/2016 | Johnson et al. |
| 2017/0176597 A1* | 6/2017 | Gruver .................. G01S 7/4817 |
| 2017/0219713 A1* | 8/2017 | Gruver .................... G01S 17/89 |
| 2018/0011196 A1* | 1/2018 | Pennecot .............. G01S 7/4808 |
| 2018/0017680 A1* | 1/2018 | Pennecot ................. G01S 17/89 |
| 2021/0278503 A1 | 9/2021 | Pennecot et al. |

FOREIGN PATENT DOCUMENTS

| | | |
|---|---|---|
| CN | 101688774 A | 3/2010 |
| CN | 102540193 A | 7/2012 |
| CN | 104132639 A | 11/2014 |
| CN | 104374376 A | 2/2015 |
| CN | 204424681 U | 6/2015 |
| CN | 104931010 A | 9/2015 |
| CN | 105548988 A | 5/2016 |
| EM | 2388615 A | 11/2011 |
| JP | H08122060 A | 5/1996 |
| JP | H09264954 A | 10/1997 |
| JP | 2003501635 A | 1/2003 |
| JP | 2004028601 A | 1/2004 |
| JP | 2006242844 A | 9/2006 |
| JP | 2008298520 A | 12/2008 |
| JP | 2011180103 A | 9/2011 |
| JP | 2014016309 A | 1/2014 |
| JP | 2014052274 A | 3/2014 |
| KR | 101040528 B1 | 6/2011 |
| KR | 20110080469 A | 7/2011 |
| KR | 20140115148 A | 9/2014 |
| KR | 20140122002 A | 10/2014 |
| TW | I540312 B | 7/2016 |
| WO | 2014190208 A2 | 11/2014 |

OTHER PUBLICATIONS

"International Search Report and Written Opinion of corresponding International Application No. PCT/US2016/019229, mailed on Jun. 16, 2016", 9 pages.

"Office Action for Chinese Patent Application No. 201680017854.8 dated Jan. 31, 2019", 12 pages (6 pages of English Translation and 6 pages of Official copy).

* cited by examiner

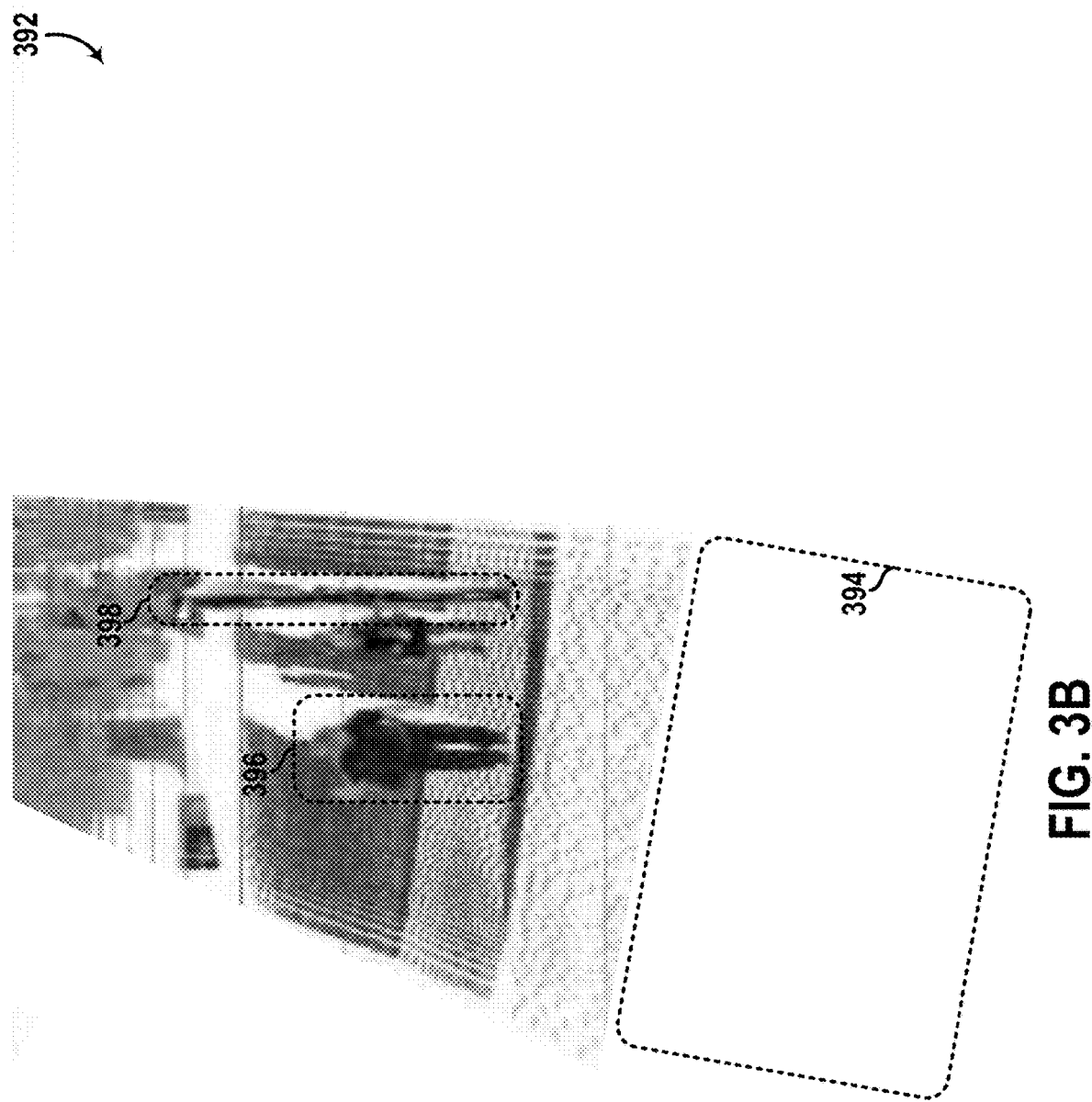

VEHICLE WITH MULTIPLE LIGHT DETECTION AND RANGING DEVICES (LIDARS)

CROSS-REFERENCE TO RELATED APPLICATION

This application is a continuation of U.S. application Ser. No. 15/715,802 filed Sep. 26, 2017, which is a continuation of U.S. application Ser. No. 15/714,326, filed Sep. 25, 2017 and issued on Nov. 6, 2018 as U.S. Pat. No. 10,120,079, which is a continuation of U.S. application Ser. No. 15/493,066, filed Apr. 20, 2017 and issued on Jan. 9, 2018 as U.S. Pat. No. 9,864,063, which is a continuation of U.S. application Ser. No. 15/455,009, filed Mar. 9, 2017 and issued on Oct. 3, 2017 as U.S. Pat. No. 9,778,364, which is a continuation of U.S. application Ser. No. 14/668,452, filed Mar. 25, 2015 and issued on Apr. 18, 2017 as U.S. Pat. No. 9,625,582, the entire contents of which are incorporated herein by reference.

BACKGROUND

Unless otherwise indicated herein, the materials described in this section are not prior art to the claims in this application and are not admitted to be prior art by inclusion in this section.

Vehicles can be configured to operate in an autonomous mode in which the vehicle navigates through an environment with little or no input from a driver. Such autonomous vehicles can include one or more sensors that are configured to detect information about the environment in which the vehicle operates.

One such sensor is a light detection and ranging (LIDAR) device. A LIDAR can estimate distance to environmental features while scanning through a scene to assemble a "point cloud" indicative of reflective surfaces in the environment. Individual points in the point cloud can be determined by transmitting a laser pulse and detecting a returning pulse, if any, reflected from an object in the environment, and determining the distance to the object according to the time delay between the transmitted pulse and the reception of the reflected pulse. A laser, or set of lasers, can be rapidly and repeatedly scanned across a scene to provide continuous real-time information on distances to reflective objects in the scene. Combining the measured distances and the orientation of the laser(s) while measuring each distance allows for associating a three-dimensional position with each returning pulse. In this way, a three-dimensional map of points indicative of locations of reflective features in the environment can be generated for the entire scanning zone.

SUMMARY

In one example, a vehicle is provided that includes one or more wheels positioned at a bottom side of the vehicle. The vehicle also includes a first light detection and ranging device (LIDAR) positioned at a top side of the vehicle opposite to the bottom side. The first LIDAR is configured to scan an environment around the vehicle based on rotation of the first LIDAR about an axis. The first LIDAR has a first resolution. The vehicle also includes a second LIDAR configured to scan a field-of-view (FOV) of the environment that extends away from the vehicle along a viewing direction of the second LIDAR. The second LIDAR has a second resolution. The vehicle also includes a controller configured to operate the vehicle based on the scans of the environment by the first LIDAR and the second LIDAR.

In another example, a method is provided that involves a vehicle scanning an environment around the vehicle based on a first light detection and ranging device (LIDAR) positioned at a top side of the vehicle and configured to rotate about an axis. One or more wheels of the vehicle are positioned at a bottom side of the vehicle opposite to the top side. The first LIDAR has a first resolution. The method further involves scanning a field-of-view (FOV) of the environment that extends away from the vehicle along a viewing direction of a second LIDAR based on the second LIDAR. The second LIDAR has a second resolution. The method further involves the vehicle operating based on the scans of the environment by the first LIDAR and the second LIDAR.

In yet another example, a vehicle is provided that includes four wheels positioned at a bottom side of the vehicle. The vehicle also includes a dome-shaped housing positioned at a top side of the vehicle opposite to the bottom side. The vehicle also includes a first light detection and ranging device (LIDAR) disposed within the dome-shaped housing. The first LIDAR is configured to scan an environment around the vehicle based on rotation of the first LIDAR about an axis. The first LIDAR has a first resolution. The vehicle also includes a second LIDAR disposed within the dome-shaped housing and positioned between the first LIDAR and the top side of the vehicle. The second LIDAR is configured to scan a field-of-view (FOV) of the environment that extends away from the vehicle along a viewing direction of the second LIDAR. The second LIDAR has a second resolution that is higher than the first resolution. The vehicle also includes a controller configured to operate the vehicle based on the scans of the environment by the first LIDAR and the second LIDAR.

In still another example, a system is provided that includes means for scanning an environment around a vehicle based on a first light detection and ranging device (LIDAR) positioned at a top side of the vehicle and configured to rotate about an axis. One or more wheels of the vehicle are positioned at a bottom side of the vehicle opposite to the top side. The first LIDAR has a first resolution. The system also comprises means for scanning a field-of-view (FOV) of the environment that extends away from the vehicle along a viewing direction of a second LIDAR based on the second LIDAR. The second LIDAR has a second resolution. The system also comprises means for the vehicle operating based on the scans of the environment by the first LIDAR and the second LIDAR.

These as well as other aspects, advantages, and alternatives, will become apparent to those of ordinary skill in the art by reading the following detailed description, with reference where appropriate to the accompanying figures.

BRIEF DESCRIPTION OF THE FIGURES

FIG. 3B illustrates a three-dimensional representation of an environment based on data from the second LIDAR of FIG. 3A, according to an example embodiment.

DETAILED DESCRIPTION

Figure 1A:
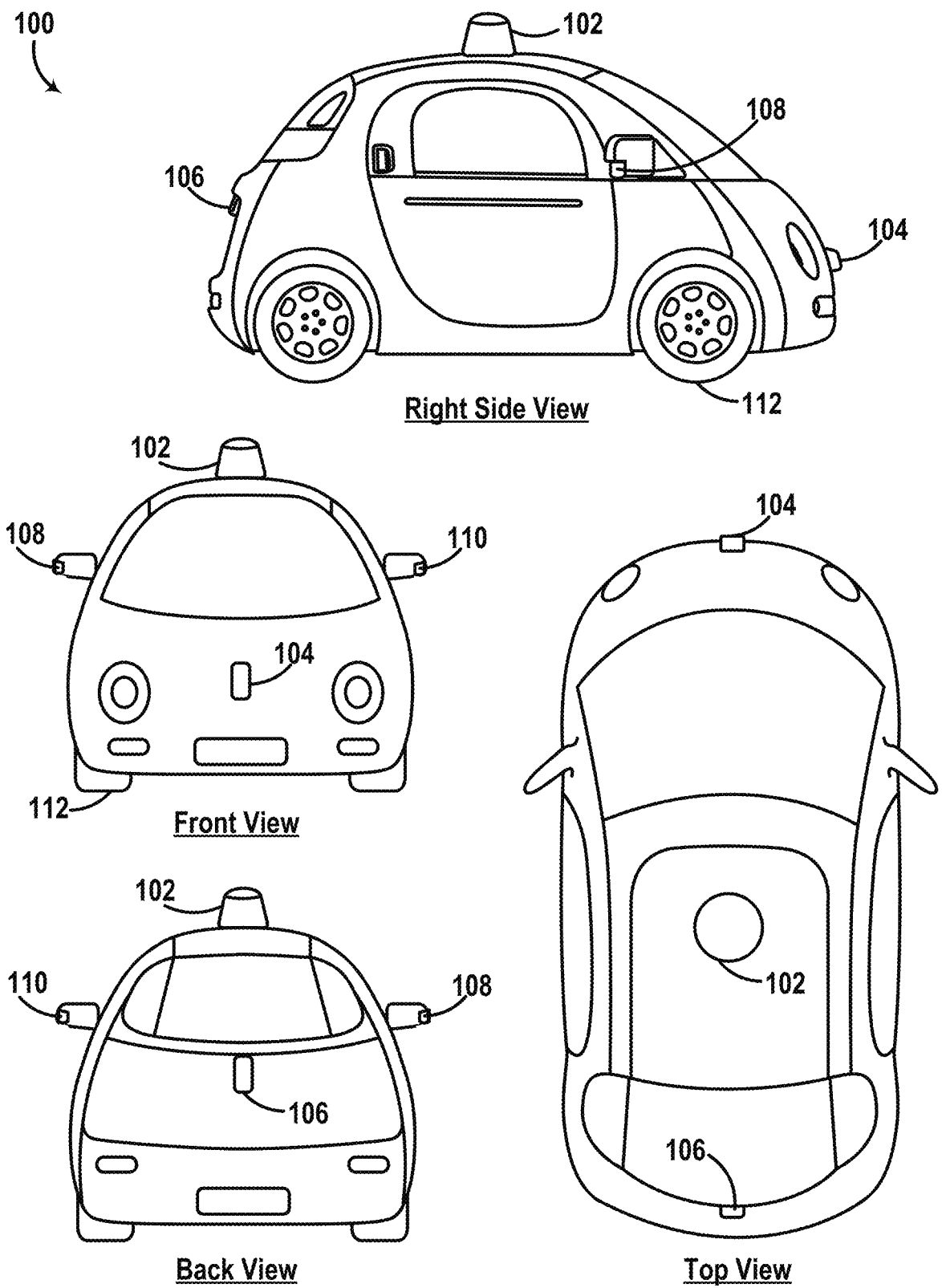
FIG. 1A illustrates a vehicle, according to an example embodiment.

The following detailed description describes various features and functions of the disclosed systems, devices and methods with reference to the accompanying figures. In the figures, similar symbols identify similar components, unless context dictates otherwise. The illustrative system, device and method embodiments described herein are not meant to be limiting. It may be readily understood by those skilled in the art that certain aspects of the disclosed systems, devices and methods can be arranged and combined in a wide variety of different configurations, all of which are contemplated herein.

There are continued efforts to improve vehicle safety and/or autonomous operation, including the development of vehicles equipped with accident-avoidance systems and remote sensing capabilities. Various sensors, such as a light detection and ranging (LIDAR) sensor among other possibilities, may be included in a vehicle to detect obstacles or objects in an environment of the vehicle and thereby facilitate accident avoidance and/or autonomous operation.

In some instances, a mounting position and/or configuration of a LIDAR may be undesirable for some object detection/identification scenarios. In one instance, a LIDAR positioned at a front side of a vehicle may be unable to scan the environment for objects behind the vehicle. In another instance, a LIDAR positioned at a top side of the vehicle may have a 360-degree field-of-view (e.g., by rotating the LIDAR), but may not detect objects near the vehicle due to the geometry of the LIDAR position at the top side of the vehicle. In yet another instance, a LIDAR that is scanning a wide field-of-view (FOV) for a scanning duration may provide a lower angular resolution 3D map of the environment than a similar LIDAR that is scanning a narrower FOV over the same scanning duration. The lower resolution, for example, may be sufficient for identifying medium range objects (e.g., within a threshold distance to the vehicle), but may be insufficient to identify long range objects (e.g., outside the threshold distance). Further, adjusting the scanning duration may affect a refresh rate of the LIDAR (i.e., rate at which the LIDAR scans the entire FOV). On one hand, a high refresh rate may allow the LIDAR to quickly detect changes in the FOV (e.g., moving objects, etc.). On the other hand, a low refresh rate may allow the LIDAR to provide higher resolution data.

However, a combination of the LIDAR functionalities described above can be beneficial for effective accident avoidance and/or autonomous operation.

Within examples herein, a vehicle is provided that includes multiple light detection and ranging devices (LIDARs) arranged and configured to facilitate scanning an environment around the vehicle according to various road conditions and scenarios.

The vehicle may include a first LIDAR positioned at a top side of the vehicle and configured to scan the environment around the vehicle based on rotation of the first LIDAR about an axis. In some examples, the vehicle may utilize the first LIDAR to scan the surrounding environment in all directions with a high refresh rate. For example, the axis of rotation may be substantially vertical such that the first LIDAR has a 360-degree FOV horizontally due to the rotation. Further, the high refresh rate may allow the vehicle to detect moving objects (e.g., other cars, etc.) quickly. On the other hand, the high refresh rate and the wide 360-degree FOV may reduce the angular resolution of the first LIDAR and, in turn, the range of distances to objects that can be properly detected and/or identified by the first LIDAR. Thus, for example, the first LIDAR may be suitable for object detection and identification within a medium range of distances (e.g., 100 meters or less, etc.). Other resolutions, ranges, and/or configurations of the first LIDAR are possible as well according to various applications of the first LIDAR. For example, the "medium" range of distances may be more or less than 100 meters depending on a type of the vehicle (e.g., car, boat, plane, etc.) or any other factor.

Additionally, the vehicle may include a second LIDAR configured to scan a particular FOV of the environment that extends away from the vehicle along a viewing direction of the second LIDAR. The particular FOV of the second LIDAR is narrower (horizontally) than the 360-degree FOV of the first LIDAR. Additionally or alternatively, in some examples, the second LIDAR may have a lower refresh rate than the refresh rate of the first LIDAR. In turn, for example, the narrower FOV and/or the lower refresh rate may allow the second LIDAR to have a higher resolution than the first LIDAR. Thus, in some examples, the second LIDAR may be suitable for detection and/or identification of objects within a long range of distances (e.g., greater than the medium range of the first LIDAR). Further, in some examples, the higher resolution data from the second LIDAR may be suitable for identification of smaller objects (e.g., debris, etc.) that are difficult to identify using the lower resolution data from the first LIDAR, even within the medium range of the first LIDAR. By way of example, the vehicle may detect a small object using data from the first LIDAR, adjust the viewing direction (e.g., using a motor, etc.) of the second LIDAR to correspond to a FOV of the environment that includes the detected small object, and thereby identify the small object using higher resolution data from the second LIDAR. In this example, the second LIDAR may be positioned adjacent to the first LIDAR at the top side of the vehicle. However, other positions, resolutions, ranges and/or configurations of the second LIDAR are possible as well and are described in greater detail within exemplary embodiments of the present disclosure.

In some examples, the vehicle may include a third LIDAR positioned at a given side of the vehicle other than the top side. For example, the third LIDAR may be mounted to a front side (e.g., bumper, hood, etc.), back side (e.g., trunk, etc.), or any other side (e.g., driver side, passenger side, etc.). In these examples, the third LIDAR may scan a given FOV of the environment extending away from the given side. By way of example, the first LIDAR and/or the second LIDAR may be unable to detect objects that are very close to the vehicle due to the position of the first LIDAR and/or second LIDAR at the top side of the vehicle. In turn, for example, the third LIDAR may allow detection and/or identification of such objects. Further, in some examples, the third LIDAR may have a resolution that is suitable for detection and/or identification of such objects within a short range of distances to the vehicle.

In some examples, the various positions and configurations of the multiple LIDARs may facilitate autonomous operation of the vehicle. By way of example, the vehicle may track moving objects in the environment using the combination of LIDARs. In one scenario, if a car in the environment is changing lanes, the vehicle may utilize the first LIDAR to quickly detect motion of the car, and the second LIDAR to resolve the position of the car relative to lane lines. In another scenario, if a motorcycle moves within a close distance to the vehicle, the vehicle may utilize the third LIDAR to track the motorcycle. In the scenarios, the vehicle may adjust its navigational path accordingly (e.g., speed, direction, etc.) to facilitate accidence avoidance.

Some embodiments of the present disclosure therefore provide systems and methods for a vehicle that includes multiple LIDARs. In some examples, each LIDAR may have a configuration (e.g., resolution, FOV, etc.) and/or position that is particularly suitable for one or more road conditions or scenarios. Thus, in some examples, the vehicle may utilize the combination of the multiple LIDARs to facilitate operation of the vehicle in an autonomous mode.

The embodiments disclosed herein may be used on any type of vehicle, including conventional automobiles and automobiles having an autonomous mode of operation. However, the term "vehicle" is to be broadly construed to cover any moving object, including, for instance, a truck, a van, a semi-trailer truck, a motorcycle, a golf cart, an off-road vehicle, a warehouse transport vehicle, or a farm vehicle, as well as a carrier that rides on a track such as a rollercoaster, trolley, tram, or train car, among other examples.

Referring now to the Figures, FIG. 1A illustrates a vehicle 100, according to an example embodiment. In particular, FIG. 1A shows a Right Side View, Front View, Back View, and Top View of the vehicle 100. Although vehicle 100 is illustrated in FIG. 1A as a car, as discussed above, other embodiments are possible. Furthermore, although the example vehicle 100 is shown as a vehicle that may be configured to operate in autonomous mode, the embodiments described herein are also applicable to vehicles that are not configured to operate autonomously. Thus, the example vehicle 100 is not meant to be limiting. As shown, the vehicle 100 includes five sensor units 102, 104, 106, 108, and 110, and four wheels, exemplified by wheel 112.

In line with the discussion above, each of the sensor units 102-110 may include one or more light detection and ranging devices (LIDARs) that have particular configuration properties to allow scanning an environment around the vehicle 100 according to various road conditions or scenarios. Additionally or alternatively, in some embodiments, the sensor units 102-110 may include any combination of global positioning system sensors, inertial measurement units, radio detection and ranging (RADAR) units, cameras, laser rangefinders, LIDARs, and/or acoustic sensors among other possibilities.

As shown, the sensor unit 102 is mounted to a top side of the vehicle 100 opposite to a bottom side of the vehicle 100 where the wheel 112 is mounted. Further, the sensor units 104-110 are each mounted to a given side of the vehicle 100 other than the top side. For example, the sensor unit 104 is positioned at a front side of the vehicle 100, the sensor 106 is positioned at a back side of the vehicle 100, the sensor unit 108 is positioned at a right side of the vehicle 100, and the sensor unit 110 is positioned at a left side of the vehicle 100.

While the sensor units 102-110 are shown to be mounted in particular locations on the vehicle 100, in some embodiments, the sensor units 102-110 may be mounted elsewhere on the vehicle 100, either inside or outside the vehicle 100. For example, although FIG. 1A shows the sensor unit 108 mounted to a rear-view mirror of the vehicle 100, the sensor unit 108 may alternatively be positioned in another location along the right side of the vehicle 100. Further, while five sensor units are shown, in some embodiments more or fewer sensor units may be included in the vehicle 100. However, for the sake of example, the sensor units 102-110 are positioned as shown in FIG. 1A.

In some embodiments, one or more of the sensor units 102-110 may include one or more movable mounts on which the sensors may be movably mounted. The movable mount may include, for example, a rotating platform. Sensors mounted on the rotating platform could be rotated so that the sensors may obtain information from various directions around the vehicle 100. For example, a LIDAR of the sensor unit 102 may have a viewing direction that can be adjusted by actuating the rotating platform to a different direction, etc. Alternatively or additionally, the movable mount may include a tilting platform. Sensors mounted on the tilting platform could be tilted within a given range of angles and/or azimuths so that the sensors may obtain information from a variety of angles. The movable mount may take other forms as well.

Further, in some embodiments, one or more of the sensor units 102-110 may include one or more actuators configured to adjust the position and/or orientation of sensors in the sensor unit by moving the sensors and/or movable mounts. Example actuators include motors, pneumatic actuators, hydraulic pistons, relays, solenoids, and piezoelectric actuators. Other actuators are possible as well.

As shown, the vehicle 100 includes one or more wheels such as the wheel 112 that are configured to rotate to cause the vehicle to travel along a driving surface. In some embodiments, the wheel 112 may include at least one tire coupled to a rim of the wheel 112. To that end, the wheel 112 may include any combination of metal and rubber, or a combination of other materials. The vehicle 100 may include one or more other components in addition to or instead of those shown.

Figure 1B:
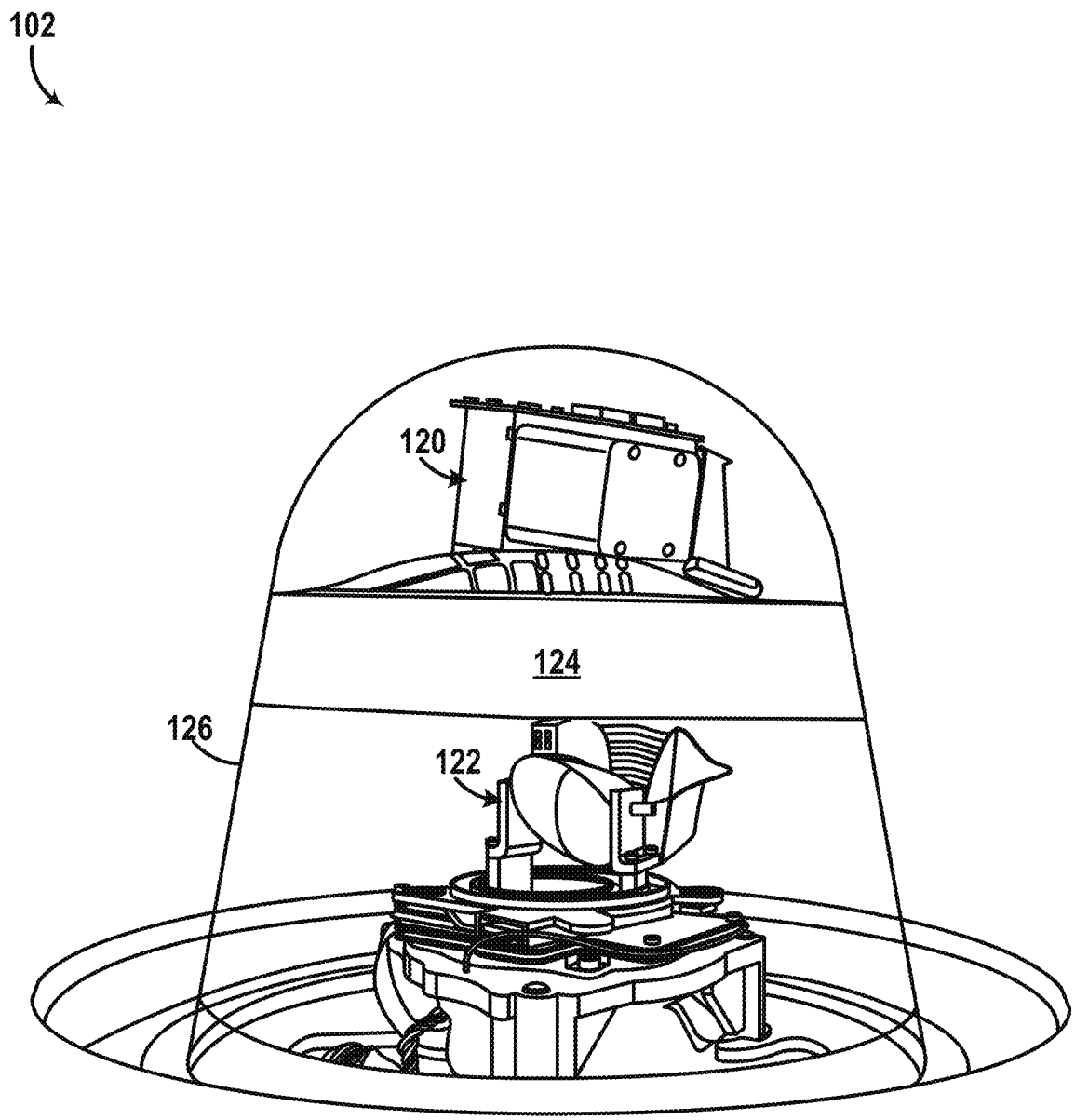
FIG. 1B is a perspective view of a sensor unit positioned at a top side of the vehicle shown in FIG. 1A.

FIG. 1B is a perspective view of the sensor unit 102 positioned at the top side of the vehicle 100 shown in FIG. 1A. As shown, the sensor unit 102 includes a first LIDAR 120, a second LIDAR 122, a dividing structure 124, and light filter 126.

In some examples, the first LIDAR 120 may be configured to scan an environment around the vehicle 100 by rotating about an axis (e.g., vertical axis, etc.) continuously while emitting one or more light pulses and detecting reflected light pulses off objects in the environment of the vehicle, for example. In some embodiments, the first LIDAR 120 may be configured to repeatedly rotate about the axis to be able to scan the environment at a sufficiently high refresh rate to quickly detect motion of objects in the environment. For instance, the first LIDAR 120 may have a refresh rate of 10 Hz (e.g., ten complete rotations of the first LIDAR 120 per second), thereby scanning a 360-degree FOV around the vehicle ten times every second. Through this process, for instance, a 3D map of the surrounding environment may be determined based on data from the first LIDAR 120. In one embodiment, the first LIDAR 120 may include a plurality of light sources that emit 64 laser beams having a wavelength of 905 nm. In this embodiment, the 3D map determined based on the data from the first LIDAR 120 may have a 0.2° (horizontal)×0.3° (vertical) angular resolution, and the first LIDAR 120 may have a 360° (horizontal)×20° (vertical) FOV of the environment. In this embodiment, the 3D map may have sufficient resolution to detect or identify objects within a medium range of 100 meters from the vehicle 100, for example. However, other configurations (e.g., number of light sources, angular resolution, wavelength, range, etc.) are possible as well.

Unlike the first LIDAR 120, in some embodiments, the second LIDAR 122 may be configured to scan a narrower FOV of the environment around the vehicle 100. For instance, the second LIDAR 122 may be configured to rotate (horizontally) for less than a complete rotation about a similar axis. Further, in some examples, the second LIDAR 122 may have a lower refresh rate than the first LIDAR 120. Through this process, the vehicle 100 may determine a 3D map of the narrower FOV of the environment using the data from the second LIDAR 122. The 3D map in this case may have a higher angular resolution than the corresponding 3D map determined based on the data from the first LIDAR 120, and may thus allow detection/identification of objects that are further than the medium range of distances of the first LIDAR 120, as well as identification of smaller objects within the medium range of distances. In one embodiment, the second LIDAR 122 may have a FOV of 8° (horizontal)× 15° (vertical), a refresh rate of 4 Hz, and may emit one narrow beam having a wavelength of 1550 nm. In this embodiment, the 3D map determined based on the data from the second LIDAR 122 may have an angular resolution of 0.1° (horizontal)×0.03° (vertical), thereby allowing detection/identification of objects within a long range of 300 meters to the vehicle 100. However, other configurations (e.g., number of light sources, angular resolution, wavelength, range, etc.) are possible as well.

In some examples, the vehicle 100 may be configured to adjust a viewing direction of the second LIDAR 122. For example, while the second LIDAR 122 has a narrow horizontal FOV (e.g., 8 degrees), the second LIDAR 122 may be mounted to a stepper motor (not shown) that allows adjusting the viewing direction of the second LIDAR 122 to directions other than that shown in FIG. 1B. Thus, in some examples, the second LIDAR 122 may be steerable to scan the narrow FOV along any viewing direction from the vehicle 100.

The structure, operation, and functionality of the first LIDAR 120 and the second LIDAR 122 are described in greater detail within exemplary embodiments herein.

The dividing structure 124 may be formed from any solid material suitable for supporting the first LIDAR 120 and/or optically isolating the first LIDAR 120 from the second LIDAR 122. Example materials may include metals, plastics, foam, among other possibilities.

The light filter 126 may be formed from any material that is substantially transparent to light having wavelengths with a wavelength range, and substantially opaque to light having wavelengths outside the wavelength range. For example, the light filter 126 may allow light having the first wavelength of the first LIDAR 120 (e.g., 905 nm) and the second wavelength of the second LIDAR 122 (e.g., 1550 nm) to propagate through the light filter 126. As shown, the light filter 126 is shaped to enclose the first LIDAR 120 and the second LIDAR 122. Thus, in some examples, the light filter 126 may also be configured to prevent environmental damage to the first LIDAR 120 and the second LIDAR 122, such as accumulation of dust or collision with airborne debris among other possibilities. In some examples, the light filter 126 may be configured to reduce visible light propagating through the light filter 126. In turn, the light filter 126 may improve an aesthetic appearance of the vehicle 100 by enclosing the first LIDAR 120 and the second LIDAR 122, while reducing visibility of the components of the sensor unit 102 from a perspective of an outside observer, for example. In other examples, the light filter 126 may be configured to allow visible light as well as the light from the first LIDAR 120 and the second LIDAR 122.

In some embodiments, portions of the light filter 126 may be configured to allow different wavelength ranges to propagate through the light filter 126. For example, an upper portion of the light filter 126 above the dividing structure 124 may be configured to allow propagation of light within a first wavelength range that includes the first wavelength of the first LIDAR 120. Further, for example, a lower portion of the light filter 126 below the dividing structure 124 may be configured to allow propagation of light within a second wavelength range that includes the second wavelength of the second LIDAR 122. In other embodiments, the wavelength range associated with the light filter 126 may include both the first wavelength of the first LIDAR 120 and the second wavelength of the second LIDAR 122.

In one embodiment, as shown, the light filter 126 having a dome shape, and may therefore be configured as a dome-shaped housing for the first LIDAR 120 and the second LIDAR 122. For instance, the dome-shaped housing (e.g., light filter 126) may include the dividing structure 124 that is positioned between the first LIDAR 120 and the second LIDAR 122. Thus, in this embodiment, the first LIDAR 120 may be disposed within the dome-shaped housing. Further, in this embodiment, the second LIDAR 122 may also be disposed within the dome-shaped housing and may be positioned between the first LIDAR 120 and the top side of the vehicle 100 as shown in FIG. 1B.

Figure 1C:
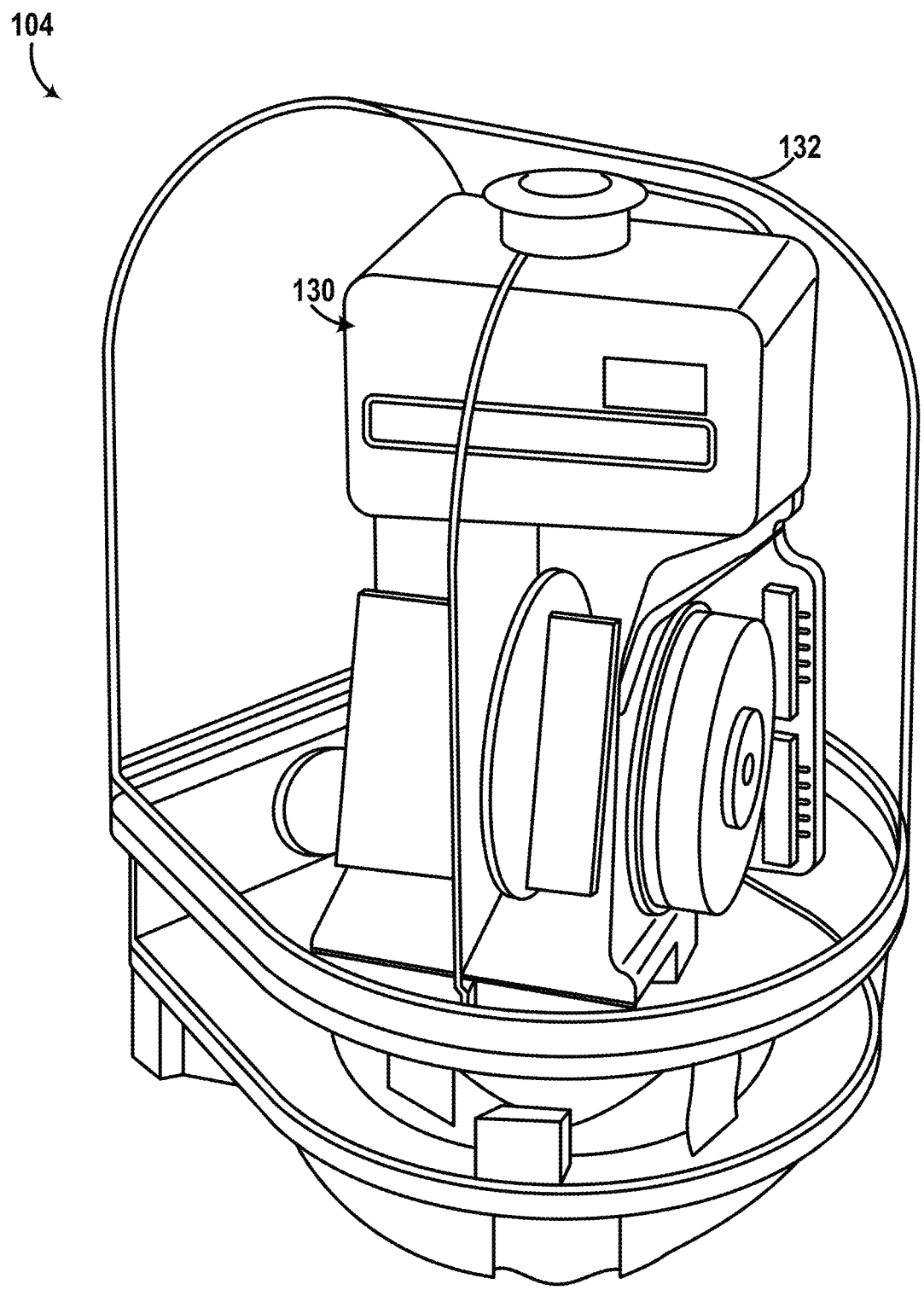
FIG. 1C is a perspective view of a sensor unit positioned at a front side of the vehicle shown in FIG. 1A.

FIG. 1C is a perspective view of the sensor unit 104 positioned at the front side of the vehicle 100 shown in FIG. 1A. In some examples, the sensor units 106, 108, and 110 may be configured similarly to the sensor unit 104 illustrated in FIG. 1C. As shown, the sensor unit 104 includes a third LIDAR 130 and a light filter 132.

The third LIDAR 130 may be configured to scan a FOV of the environment around the vehicle 100 that extends away from a given side of the vehicle 100 (i.e., the front side) where the third LIDAR 130 is positioned. Thus, in some examples, the third LIDAR 130 may be configured to rotate (e.g., horizontally) across a wider FOV than the second LIDAR 122 but less than the 360-degree FOV of the first LIDAR 120 due to the positioning of the third LIDAR 130. In one embodiment, the third LIDAR 130 may have a FOV of 270° (horizontal)×110° (vertical), a refresh rate of 4 Hz, and may emit one laser beam having a wavelength of 905 nm. In this embodiment, the 3D map determined based on the data from the third LIDAR 130 may have an angular resolution of 1.2° (horizontal)×0.2° (vertical), thereby allowing detection/identification of objects within a short range of 30 meters to the vehicle 100. However, other configurations (e.g., number of light sources, angular resolution, wavelength, range, etc.) are possible as well. The structure, operation, and functionality of the third LIDAR 130 are described in greater detail within exemplary embodiments of the present disclosure.

The light filter 132 may be similar to the light filter 126 of FIG. 1B. For example, the light filter 132 may be shaped to enclose the third LIDAR 130. Further, for example, the light filter 132 may be configured to allow light within a wavelength range that includes the wavelength of light from the third LIDAR 130 to propagate through the light filter 132. In some examples, the light filter 132 may be configured to reduce visible light propagating through the light filter 132, thereby improving an aesthetic appearance of the vehicle 100.

Figure 1D:
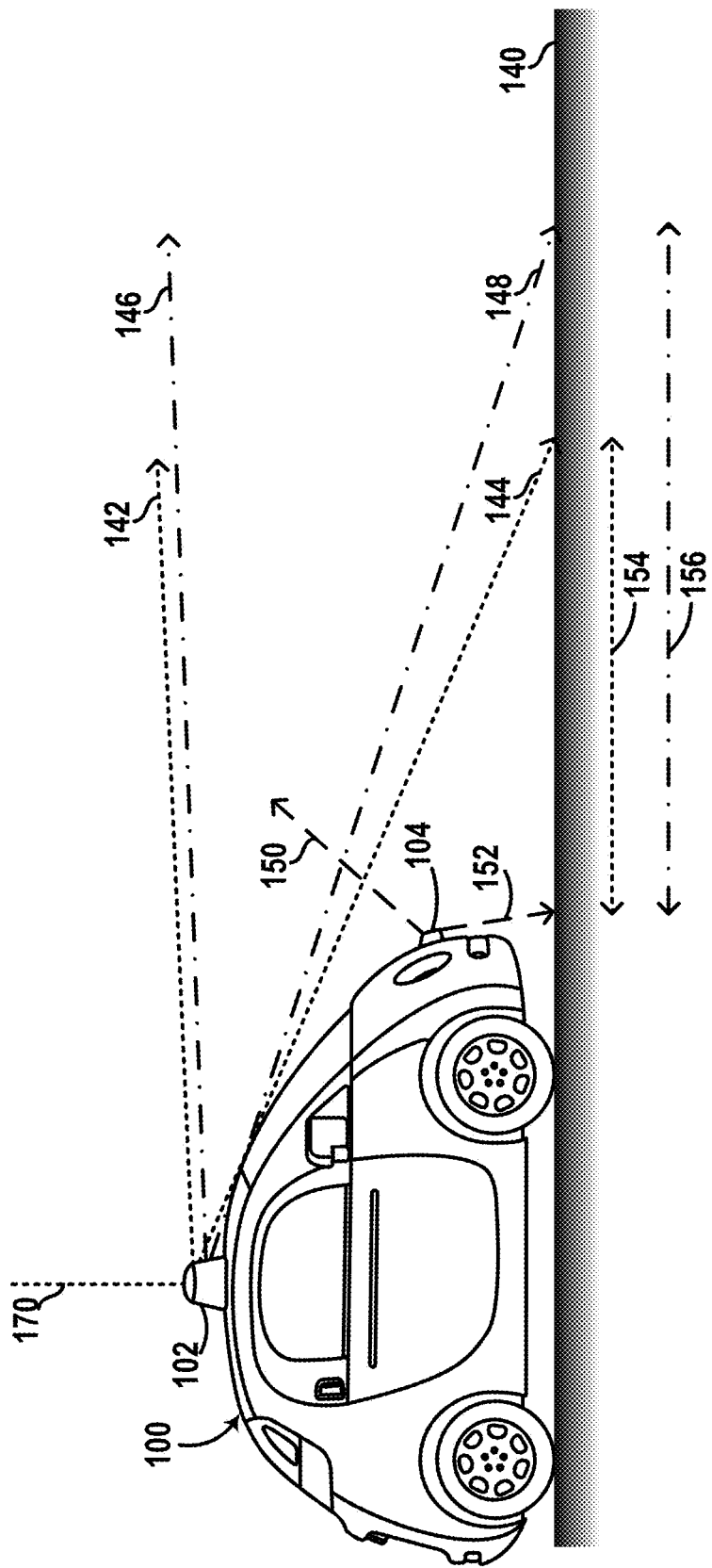
FIGS. 1D-1E illustrate the vehicle shown in FIG. 1A scanning a surrounding environment, according to an example embodiment.
Figure 1E:
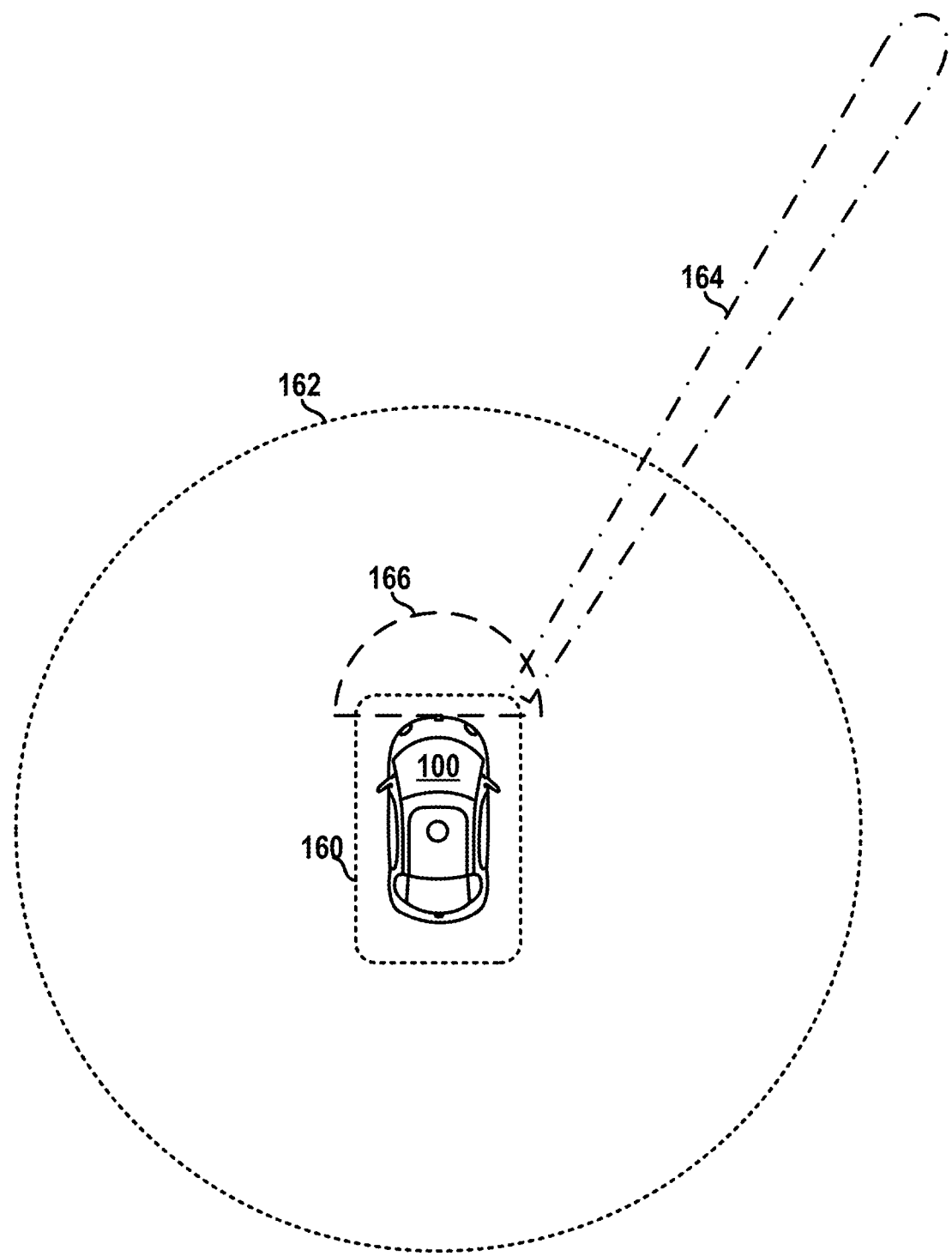

FIGS. 1D-1E illustrate the vehicle 100 shown in FIG. 1A scanning a surrounding environment, according to an example embodiment.

FIG. 1D illustrates a scenario where the vehicle 100 is operating on a surface 140. The surface 140, for example, may be a driving surface such as a road or a highway, or any other surface. In FIG. 1D, the arrows 142, 144, 146, 148, 150, 152 illustrate light pulses emitted by various LIDARs of the sensor units 102 and 104 at ends of the vertical FOV of the respective LIDAR.

By way of example, arrows 142 and 144 illustrate light pulses emitted by the first LIDAR 120 of FIG. 1B. In this example, the first LIDAR 120 may emit a series of pulses in the region of the environment between the arrows 142 and 144 and may receive reflected light pulses from that region to detect and/or identify objects in that region. Due to the positioning of the first LIDAR 120 (not shown) of the sensor unit 102 at the top side of the vehicle 100, the vertical FOV of the first LIDAR 120 is limited by the structure of the vehicle 100 (e.g., roof, etc.) as illustrated in FIG. 1D. However, the positioning of the first LIDAR 120 in the sensor unit 102 at the top side of the vehicle 100 allows the first LIDAR 120 to scan all directions around the vehicle 100 by rotating about a substantially vertical axis 170. Similarly, for example, the arrows 146 and 148 illustrate light pulses emitted by the second LIDAR 122 of FIG. 1B at the ends of the vertical FOV of the second LIDAR 122. Further, the second LIDAR 122 may also be steerable to adjust a viewing direction of the second LIDAR 122 to any direction around the vehicle 100 in line with the discussion. In one embodiment, the vertical FOV of the first LIDAR 120 (e.g., angle between arrows 142 and 144) is 20° and the vertical FOV of the second LIDAR 122 is 15° (e.g., angle between arrows 146 and 148). However, other vertical FOVs are possible as well depending, for example, on factors such as structure of the vehicle 100 or configuration of the respective LIDARs.

As shown in FIG. 1D, the sensor unit 102 (including the first LIDAR 120 and/or the second LIDAR 122) may scan for objects in the environment of the vehicle 100 in any direction around the vehicle 100 (e.g., by rotating, etc.), but may be less suitable for scanning the environment for objects in close proximity to the vehicle 100. For example, as shown, objects within distance 154 to the vehicle 100 may be undetected or may only be partially detected by the first LIDAR 120 of the sensor unit 102 due to positions of such objects being outside the region between the light pulses illustrated by the arrows 142 and 144. Similarly, objects within distance 156 may also be undetected or may only be partially detected by the second LIDAR 122 of the sensor unit 102.

Accordingly, the third LIDAR 130 (not shown) of the sensor unit 104 may be used for scanning the environment for objects that are close to the vehicle 100. For example, due to the positioning of the sensor unit 104 at the front side of the vehicle 100, the third LIDAR 130 may be suitable for scanning the environment for objects within the distance 154 and/or the distance 156 to the vehicle 100, at least for the portion of the environment extending away from the front side of the vehicle 100. As shown, for example, the arrows 150 and 152 illustrate light pulses emitted by the third LIDAR 130 at ends of the vertical FOV of the third LIDAR 130. Thus, for example, the third LIDAR 130 of the sensor unit 104 may be configured to scan a portion of the environment between the arrows 150 and 152, including objects that are close to the vehicle 100. In one embodiment, the vertical FOV of the third LIDAR 130 is 110° (e.g., angle between arrows 150 and 152). However, other vertical FOVs are possible as well.

It is noted that the angles between the various arrows 142-152 shown in FIG. 1D are not to scale and are for illustrative purposes only. Thus, in some examples, the vertical FOVs of the various LIDARs may vary as well.

FIG. 1E illustrates a top view of the vehicle 100 in a scenario where the vehicle 100 is scanning a surrounding environment. In line with the discussion above, each of the various LIDARs of the vehicle 100 may have a particular resolution according to its respective refresh rate, FOV, or any other factor. In turn, the various LIDARs may be suitable for detection and/or identification of objects within a respective range of distances to the vehicle 100.

As shown in FIG. 1E, contours 160 and 162 illustrate an example range of distances to the vehicle 100 where objects may be detected/identified based on data from the first LIDAR 120 of the sensor unit 102. As illustrated, for example, close objects within the contour 160 may not be properly detected and/or identified due to the positioning of the sensor unit 102 on the top side of the vehicle 100. However, for example, objects outside of contour 160 and within a medium range of distances (e.g., 100 meters, etc.) defined by the contour 162 may be properly detected/identified using the data from the first LIDAR 120. Further, as shown, the horizontal FOV of the first LIDAR 120 may span 360° in all directions around the vehicle 100.

Further, as shown in FIG. 1E, contour 164 illustrates a region of the environment where objects may be detected and/or identified using the higher resolution data from the second LIDAR 122 of the sensor unit 102. As shown, the contour 164 includes objects further away from the vehicle 100 within a long range of distances (e.g., 300 meters, etc.), for example. Although the contour 164 indicates a narrower FOV (horizontally) of the second LIDAR 122, in some examples, the vehicle 100 may be configured to adjust the viewing direction of the second LIDAR 122 to any other direction than that shown in FIG. 1E. By way of example, the vehicle 100 may detect an object using the data from the first LIDAR 120 (e.g., within the contour 162), adjust the viewing direction of the second LIDAR 122 to a FOV that includes the object, and then identify the object using the higher resolution data from the second LIDAR 122. In one embodiment, the horizontal FOV of the second LIDAR 122 may be 8°.

Further, as shown in FIG. 1E, contour 166 illustrates a region of the environment scanned by the third LIDAR 130 of the sensor unit 104. As shown, the region illustrated by the contour 166 includes portions of the environment that may not be scanned by the first LIDAR 120 and/or the second LIDAR 124, for example. Further, for example, the data from the third LIDAR 130 has a resolution sufficient to detect and/or identify objects within a short distance (e.g., 30 meters, etc.) to the vehicle 100.

It is noted that the ranges, resolutions, and FOVs described above are for exemplary purposes only, and may vary according to various configurations of the vehicle 100. Further, the contours 160-166 shown in FIG. 1E are not to scale but are illustrated as shown for convenience of description.

Figure 2A:
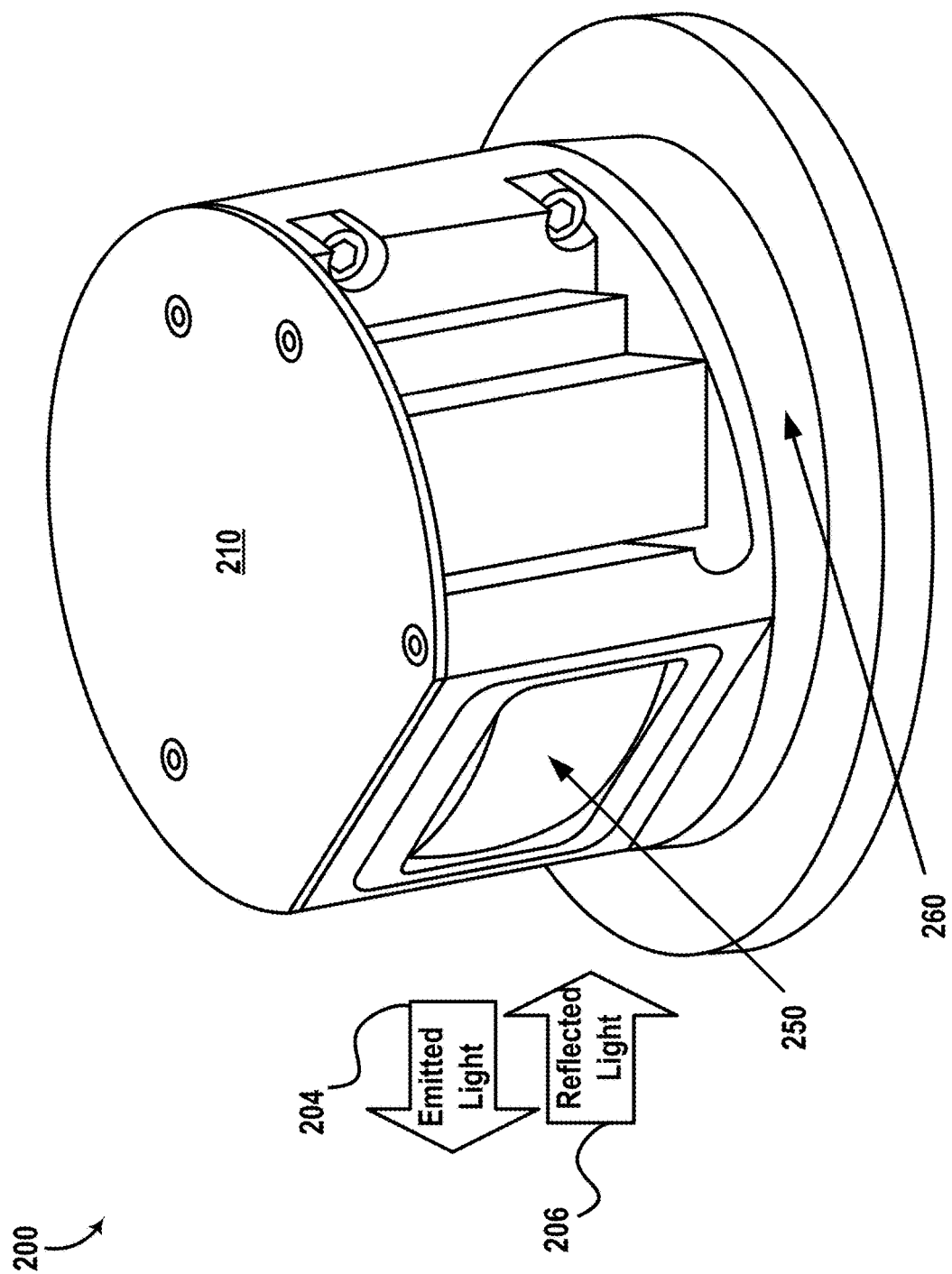
FIG. 2A illustrates a first LIDAR, according to an example embodiment.

FIG. 2A illustrates a first LIDAR 200, according to an example embodiment. In some examples, the first LIDAR 200 may be similar to the first LIDAR 120 of FIG. 1B, the second LIDAR 122 of FIG. 1B, the third LIDAR 130 of FIG. 1C, and/or any other LIDAR device mounted to a vehicle such as the vehicle 100. For example, the first LIDAR 200 may be mounted at a top side of a vehicle such as the vehicle 100 similarly to the first LIDAR 120 of the FIG. 1B. As shown, the LIDAR device 200 includes a housing 210 and a lens 250. Additionally, light beams 204 emitted by the first LIDAR device 200 propagate from the lens 250 along a viewing direction of the first LIDAR 200 toward an environment of the LIDAR device 200, and reflect off one or more objects in the environment as reflected light 206.

The housing 210 included in the LIDAR device 200 can provide a platform for mounting the various components included in the LIDAR device 200. The housing 210 can be formed from any material capable of supporting the various components of the LIDAR device 200 included in an interior space of the housing 210. For example, the housing 210 may be formed from a solid material such as plastic or metal among other possibilities.

In some examples, the housing 210 can be configured to have a substantially cylindrical shape and to rotate about an axis of the LIDAR device 200. For example, the housing 210 can have the substantially cylindrical shape with a diameter of approximately 10 centimeters. In some examples, the axis is substantially vertical. By rotating the housing 210 that includes the various components, in some examples, a three-dimensional map of a 360-degree view of the environment of the LIDAR device 200 can be determined without frequent recalibration of the arrangement of the various components of the LIDAR device 200. Additionally or alternatively, in some examples, the LIDAR device 200 can be configured to tilt the axis of rotation of the housing 210 to control the field of view of the LIDAR device 200.

The lens 250 mounted to the housing 210 can have an optical power to both collimate the emitted light beams 204, and focus the reflected light 205 from one or more objects in the environment of the LIDAR device 200 onto detectors in the LIDAR device 200. In one example, the lens 250 has a focal length of approximately 120 mm. By using the same lens 250 to perform both of these functions, instead of a transmit lens for collimating and a receive lens for focusing, advantages with respect to size, cost, and/or complexity can be provided.

The LIDAR device 200 can be mounted on a mounting structure 260 that rotates about an axis to provide a 360-degree view of the environment surrounding the LIDAR device 200. In some examples, the mounting structure 260 may comprise a movable platform that may tilt in one or more directions to change the axis of rotation of the LIDAR device 200.

Figure 2B:
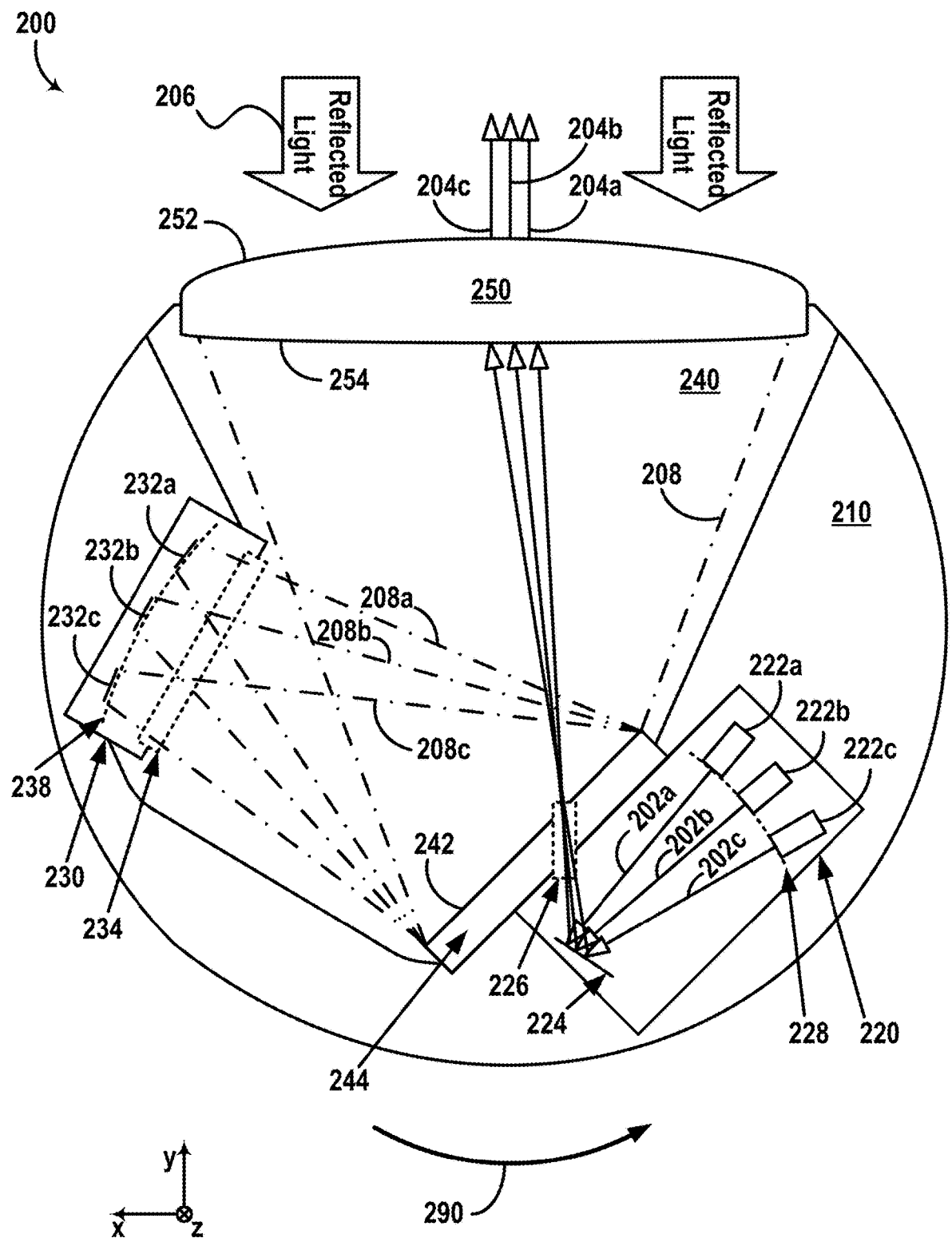
FIG. 2B is a cross-section view of the first LIDAR shown in FIG. 2A.

FIG. 2B is a cross-section view of the first LIDAR 200 shown in FIG. 2A. As shown, the housing 210 houses a transmit block 220, a receive block 230, a shared space 240, and the lens 250. For purposes of illustration, FIG. 2B shows an x-y-z axis, in which the z-axis is in a substantially vertical direction.

The transmit block 220 includes a plurality of light sources 222a-c arranged along a curved focal surface 228 defined by the lens 250. The plurality of light sources 222a-c can be configured to emit, respectively, the plurality of light beams 202a-c having wavelengths within a wavelength range. For example, the plurality of light sources 222a-c may comprise laser diodes that emit the plurality of light beams 202a-c having the wavelengths within the wavelength range. The plurality of light beams 202a-c are reflected by mirror 224 through an exit aperture 226 into the shared space 240 and towards the lens 250.

The light sources 222a-c can include laser diodes, light emitting diodes (LED), vertical cavity surface emitting lasers (VCSEL), organic light emitting diodes (OLED), polymer light emitting diodes (PLED), light emitting polymers (LEP), liquid crystal displays (LCD), microelectromechanical systems (MEMS), or any other device configured to selectively transmit, reflect, and/or emit light to provide the plurality of emitted light beams 202a-c. In some examples, the light sources 222a-c can be configured to emit the emitted light beams 202a-c in a wavelength range that can be detected by detectors 232a-c included in the receive block 230. The wavelength range could, for example, be in the ultraviolet, visible, and/or infrared portions of the electromagnetic spectrum. In some examples, the wavelength range can be a narrow wavelength range, such as provided by lasers. In one example, the wavelength range includes wavelengths that are approximately 905 nm. Additionally, the light sources 222a-c can be configured to emit the emitted light beams 202a-c in the form of pulses. In some examples, the plurality of light sources 222a-c can be disposed on one or more substrates (e.g., printed circuit boards (PCB), flexible PCBs, etc.) and arranged to emit the plurality of light beams 202a-c towards the exit aperture 226.

Although FIG. 2B shows that the curved focal surface 228 is curved in the x-y plane, additionally or alternatively, the plurality of light sources 222a-c may be arranged along a focal surface that is curved in a vertical plane. For example, the curved focal surface 228 can have a curvature in a vertical plane, and the plurality of light sources 222a-c can include additional light sources arranged vertically along the curved focal surface 228 and configured to emit light beams directed at the mirror 224 and reflected through the exit aperture 226. In this example, the detectors 232a-c may also include additional detectors that correspond to additional light sources of the light sources 222a-c. Further, in some examples, the light sources 222a-c may include additional light sources arranged horizontally along the curved focal surface 228. In one embodiment, the light sources 222a-c may include 64 light sources that emit light having a wavelength of 905 nm. For instance, the 64 light sources may be arranged in four columns, each comprising 16 light sources, along the curved focal surface 228. In this instance, the detectors 232a-c may include 64 detectors that are arranged similarly (e.g., 4 columns comprising 16 detectors each, etc.) along curved focal surface 238. In other embodiments, the light sources 222a-c and the detectors 232a-c may include more or less light sources and/or detectors than those shown in FIG. 2B.

Due to the arrangement of the plurality of light sources 222a-c along the curved focal surface 228, the plurality of light beams 202a-c, in some examples, may converge towards the exit aperture 226. Thus, in these examples, the exit aperture 226 may be minimally sized while being capable of accommodating vertical and horizontal extents of the plurality of light beams 202a-c. Additionally, in some examples, the curved focal surface 228 can be defined by the lens 250. For example, the curved focal surface 228 may correspond to a focal surface of the lens 250 due to shape and composition of the lens 250. In this example, the plurality of light sources 222a-c can be arranged along the focal surface defined by the lens 250 at the transmit block.

The plurality of light beams 202a-c propagate in a transmit path that extends through the transmit block 220, the exit aperture 226, and the shared space 240 towards the lens 250. The lens 250 collimates the plurality of light beams 202a-c to provide collimated light beams 204a-c into an environment of the LIDAR device 200. The collimated light beams 204a-c correspond, respectively, to the plurality of light beams 202a-c. In some examples, the collimated light beams 204a-c reflect off one or more objects in the environment of the LIDAR device 200 as reflected light 206. The reflected light 206 may be focused by the lens 250 into the shared space 240 as focused light 208 traveling along a receive path that extends through the shared space 240 onto the receive block 230. For example, the focused light 208 may be reflected by the reflective surface 242 as focused light 208a-c propagating towards the receive block 230.

The lens 250 may be capable of both collimating the plurality of light beams 202a-c and focusing the reflected light 206 along the receive path 208 towards the receive block 230 due to shape and composition of the lens 250. For example, the lens 250 can have an aspheric surface 252 facing outside of the housing 210 and a toroidal surface 254 facing the shared space 240. By using the same lens 250 to perform both of these functions, instead of a transmit lens for collimating and a receive lens for focusing, advantages with respect to size, cost, and/or complexity can be provided.

The exit aperture 226 is included in a wall 244 that separates the transmit block 220 from the shared space 240. In some examples, the wall 244 can be formed from a transparent material (e.g., glass) that is coated with a reflective material 242. In this example, the exit aperture 226 may correspond to the portion of the wall 244 that is not coated by the reflective material 242. Additionally or alternatively, the exit aperture 226 may comprise a hole or cut-away in the wall 244.

The focused light 208 is reflected by the reflective surface 242 and directed towards an entrance aperture 234 of the receive block 230. In some examples, the entrance aperture 234 may comprise a filtering window configured to allow wavelengths in the wavelength range of the plurality of light beams 202a-c emitted by the plurality of light sources 222a-c and attenuate other wavelengths. The focused light 208a-c reflected by the reflective surface 242 from the focused light 208 propagates, respectively, onto a plurality of detectors 232a-c.

The plurality of detectors 232a-c can be arranged along a curved focal surface 238 of the receive block 230. Although FIG. 2 shows that the curved focal surface 238 is curved along the x-y plane (horizontal plane), additionally or alternatively, the curved focal surface 238 can be curved in a vertical plane. The curvature of the focal surface 238 is also defined by the lens 250. For example, the curved focal surface 238 may correspond to a focal surface of the light projected by the lens 250 along the receive path at the receive block 230.

The detectors 232a-c may comprise photodiodes, avalanche photodiodes, phototransistors, cameras, active pixel sensors (APS), charge coupled devices (CCD), cryogenic detectors, or any other sensor of light configured to receive focused light 208a-c having wavelengths in the wavelength range of the emitted light beams 202a-c.

Each of the focused light 208a-c corresponds, respectively, to the emitted light beams 202a-c and is directed onto, respectively, the plurality of detectors 232a-c. For example, the detector 232a is configured and arranged to received focused light 208a that corresponds to collimated light beam 204a reflected of the one or more objects in the environment of the LIDAR device 200. In this example, the collimated light beam 204a corresponds to the light beam 202a emitted by the light source 222a. Thus, the detector 232a receives light that was emitted by the light source 222a, the detector 232b receives light that was emitted by the light source 222b, and the detector 232c receives light that was emitted by the light source 222c.

By comparing the received light 208a-c with the emitted light beams 202a-c, at least one aspect of the one or more object in the environment of the LIDAR device 200 may be determined. For example, by comparing a time when the plurality of light beams 202a-c were emitted by the plurality of light sources 222a-c and a time when the plurality of detectors 232a-c received the focused light 208a-c, a distance between the LIDAR device 200 and the one or more object in the environment of the LIDAR device 200 may be determined. In some examples, other aspects such as shape, color, material, etc. may also be determined.

In some examples, the LIDAR device 200 may be rotated about an axis to determine a three-dimensional map of the surroundings of the LIDAR device 200. For example, the LIDAR device 200 may be rotated about a substantially vertical axis as illustrated by arrow 290. Although illustrated that the LIDAR device 200 is rotated counter clock-wise about the axis as illustrated by the arrow 290, additionally or alternatively, the LIDAR device 200 may be rotated in the clockwise direction. In some examples, the LIDAR device 200 may be rotated 360 degrees about the axis, similarly to the first LIDAR 120 of FIG. 1B. In other examples, the LIDAR device 200 may be rotated back and forth along a portion of the 360 degree view of the LIDAR device 200, similarly to the second LIDAR 122 of FIG. 1B. For example, the LIDAR device 200 may be mounted on a platform that wobbles back and forth about the axis without making a complete rotation.

Thus, the arrangement of the light sources 222a-c and the detectors 232a-c may allow the LIDAR device 200 to have a particular vertical field-of-view. In one example, the vertical FOV of the LIDAR device 200 is 20°. Additionally, the rotation of the LIDAR device 200 allows the LIDAR device 200 to have a 360° horizontal FOV. Further, the rate of rotation may allow the device to have a particular refresh rate. In one example, the refresh rate is 10 Hz. The refresh rate along with the arrangement of the light sources 222a-c and the detectors 232a-c may also allow the LIDAR device 300 to have a particular angular resolution. In one example, the angular resolution is 0.2°×0.3°. However, the various parameters such as the refresh rate and the angular resolution may vary according to the configuration of the LIDAR device 200. Further, in some examples, the LIDAR device 200 may include additional or fewer components than those shown in FIGS. 2A-2B.

Figure 2C:
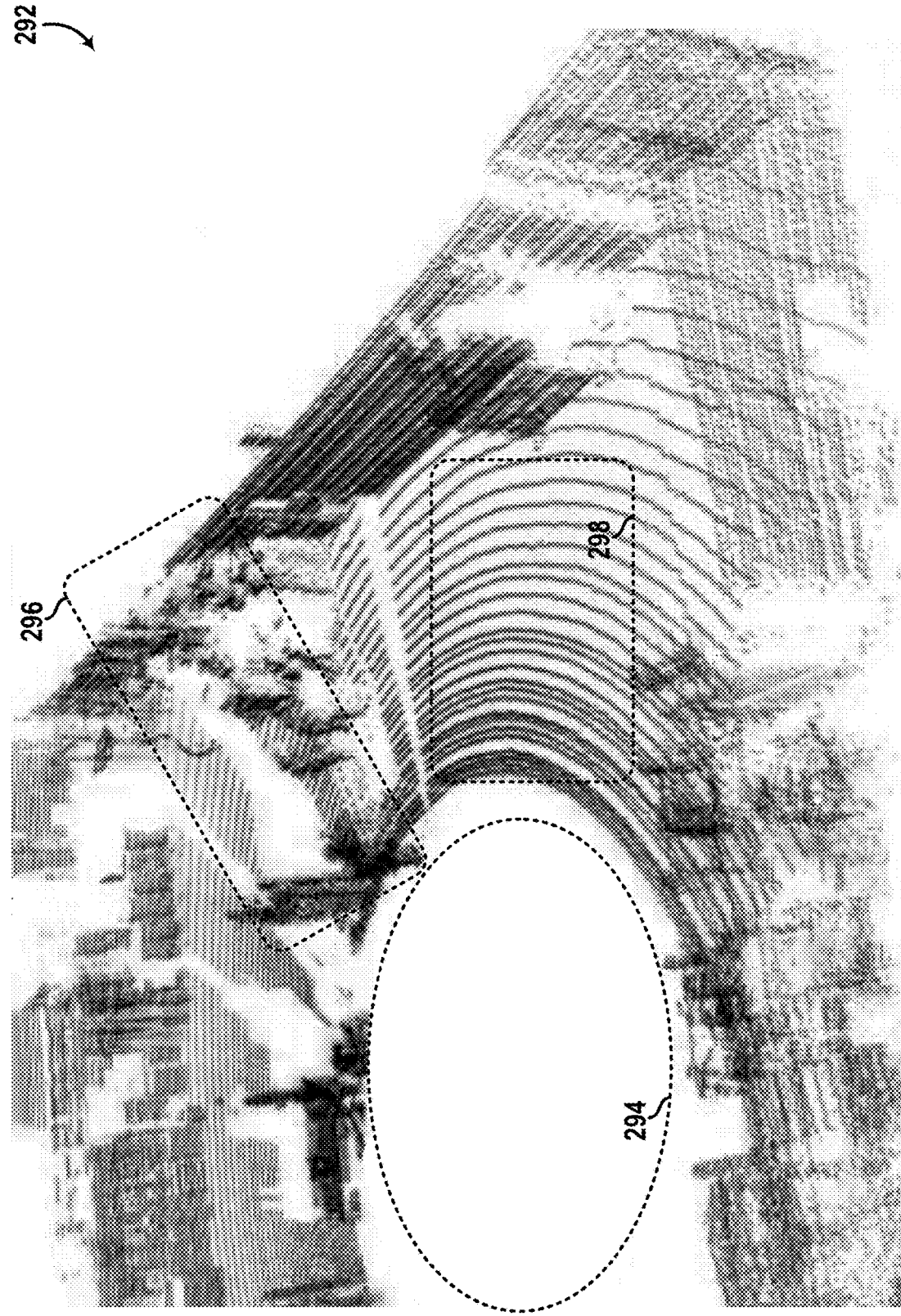
FIG. 2C illustrates a three-dimensional representation of an environment based on data from the first LIDAR of FIG. 2A, according to an example embodiment.

FIG. 2C illustrates a three-dimensional (3D) representation 292 of an environment based on data from the first LIDAR 200 of FIG. 2A, according to an example embodiment. In some examples, the 3D representation 292 may be generated by a computing device as a 3D point cloud based on the data from the first LIDAR 200. Each point of the 3D cloud, for example, may be associated with a reflected light pulse from the reflected light beams 206 shown in FIG. 2B. Thus, as shown, points at a greater distance from the LIDAR 200 are further from one another due to the angular resolution of the LIDAR 200. Based on the rotation of the first LIDAR 200, the 3D representation 292 includes a scan of the environment in all directions (360° horizontally) as shown in FIG. 2C. Further, as shown, a region 294 of the 3D representation 292 does not include any points. For example, the region 294 may correspond to the contour 160 (FIG. 1E) around the vehicle 100 that the first LIDAR 120 of FIG. 1B is unable to scan due to positioning at the top side of the vehicle 100. Further, as shown, a region 296 is indicative of objects in the environment of the LIDAR device 200. For example, the objects in the region 296 may correspond to pedestrians, vehicles, or other obstacles in the environment of the LIDAR device 200. In an example scenario where the LIDAR device 200 is mounted to a vehicle such as the vehicle 100, the vehicle 100 may utilize the 3D representation 292 to navigate the vehicle away from region 296 towards region 298 that does not include the obstacles of the region 296.

Figure 3A:
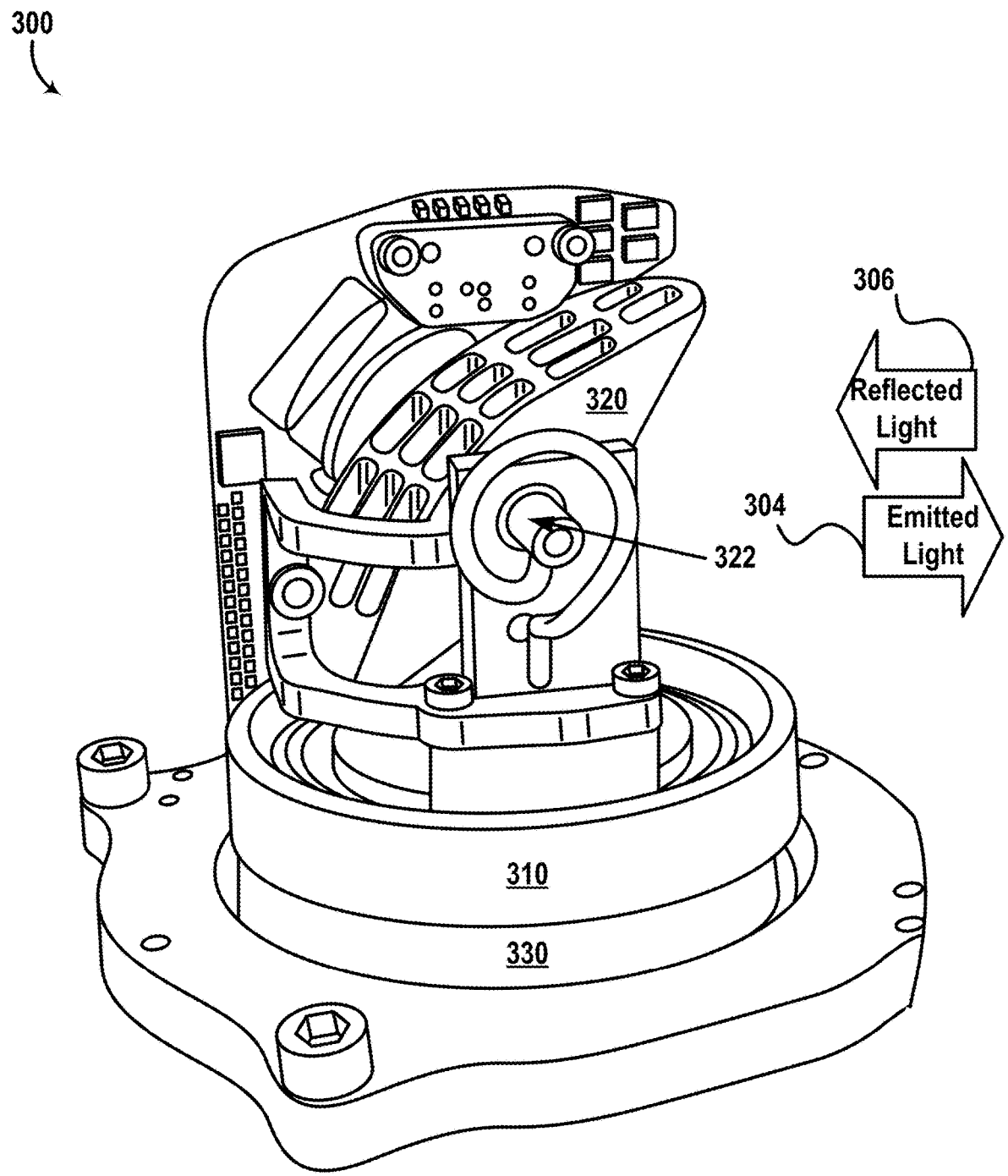
FIG. 3A illustrates a second LIDAR, according to an example embodiment.

FIG. 3A illustrates a second LIDAR 300, according to an example embodiment. In some examples, the second LIDAR 300 may be similar to the first LIDAR 120 of FIG. 1B, the second LIDAR 122 of FIG. 1B, the third LIDAR 130 of FIG. 1C, and/or any other LIDAR mounted to a vehicle such as the vehicle 100. For example, the second LIDAR 300 may be mounted at a top side of a vehicle such as the vehicle 100 similarly to the second LIDAR 122 of the FIG. 1B. As shown, the LIDAR device 300 includes an optics assembly 310, a mirror 320, a pin 322, and a platform/stepper motor 330. Additionally, light beams 304 emitted by the second LIDAR device 300 propagate away from the mirror 320 along a viewing direction of the second LIDAR 300 toward an environment of the LIDAR device 300, and reflect of one or more objects in the environment as reflected light 306.

The optics assembly 310 may be configured to emit light pulses towards the mirror 320 that are then reflected by the mirror 320 as the emitted light 304. Further, the optics assembly 310 may be configured to receive reflected light 306 that is reflected off the mirror 320. In one embodiment, the optics assembly 310 may include a single laser emitter that is configured to provide a narrow beam having a wavelength of 1550 nm. In this embodiment, the narrow beam may have a high energy sufficient for detection of objects within a long range of distances, similarly to the second LIDAR 122 of FIG. 1B. In other embodiments, the optics assembly 310 may include multiple light sources similarly to the LIDAR 200 of FIGS. 2A-2B. Further, in some examples, the optics assembly 310 may include a single lens for both collimation of emitted light 304 and focusing of reflected light 306. In other examples, the optics assembly 310 may include a first lens for collimation of emitted light 304 and a second lens for focusing of reflected light 306.

The mirror 320 may be arranged to steer emitted light 304 from the optics assembly 310 towards the viewing direction of the LIDAR 300 as illustrated in FIG. 3A. Similarly, for example, the mirror 320 may be arranged to steer reflected light 306 from the environment towards the optics assembly 310.

The pin 322 may be configured to mount the mirror 320 to the LIDAR device 300. In turn, the pin 322 can be formed from any material capable of supporting the mirror 320. For example, the pin 322 may be formed from a solid material such as plastic or metal among other possibilities. In some examples, the LIDAR 300 may be configured to rotate the mirror 320 about the pin 322 over a given range of angles to steer the emitted light 304 vertically. In one embodiment, the LIDAR 300 may rotate the mirror 320 about the pin 322 over the range of angles of 15°. In this embodiment, the vertical FOV of the LIDAR 300 may correspond to 15°. However, other vertical FOVs are possible as well according to various factors such as the mounting position of the LIDAR 300 or any other factor.

The platform 330 can be formed from any material capable of supporting various components of the LIDAR 300 such as the optics assembly 310 and the mirror 320. For example, the platform 330 may be formed from a solid material such as plastic or metal among other possibilities. In some examples, the platform 330 may be configured to rotate about an axis of the LIDAR device 300. For example, the platform 330 may include or may be a motor such as a stepper motor to facilitate such rotation. In some examples, the axis is substantially vertical. By rotating the platform 330 that supports the various components, in some examples, the platform 330 may steer the emitted light 304 horizontally, thus allowing the LIDAR 300 to have a horizontal FOV. In one embodiment, the platform 330 may rotate for a defined amount of rotation such as 8°. In this embodiment, the LIDAR 300 may thus have a horizontal FOV of 8°, similarly to the second LIDAR 122 of FIG. 1B. In another embodiment, the platform 330 may rotate for complete 360° rotation such that the horizontal FOV is 360°, similarly to the first LIDAR 120 of FIG. 1B. In yet another embodiment, the platform 330 may rotate for 270°, such that the horizontal FOV is 270° similarly to the third LIDAR 130 of FIG. 1C. Other configurations of the platform 330 are possible as well. Thus, in some examples, the LIDAR 300 may provide an alternative device for scanning the environment or a portion thereof to the device of the LIDAR 200 of FIGS. 2A-2B.

FIG. 3B illustrates a 3D representation 392 of an environment based on data from the second LIDAR 300 of FIG. 3A, according to an example embodiment. In some examples, the 3D representation 392 may be generated, similarly to the 3D representation 292 of FIG. 2C, by a computing device as a 3D point cloud based on the data from the second LIDAR 300. Each point of the 3D cloud, for example, may be associated with a reflected light pulse from the reflected light beams 306 shown in FIG. 3A.

As shown, the 3D representation 392 includes a region 394 similar to the region 294 of the 3D representation 292 that may be an unscanned region due to positioning of the second LIDAR 300 at the top side of a vehicle. For example, the region 294 may correspond to the contour 160 of FIG. 1E around the vehicle 100.

Unlike the 3D representation 292 of FIG. 2C, however, the 3D representation 392 spans a much narrower field-of-view. For example, the FOV scanned by the LIDAR 300 and illustrated in the 3D representation 392 may correspond to the contour 164 of FIG. 1E. Due in part to the narrower FOV, the 3D representation 392 has a higher resolution than the 3D representation 292. For instance, points in the point cloud are closer to one another and thus some objects in the environment may be easily identified compared to the objects in the environment represented by the 3D representation 292.

In an example scenario, a vehicle such as the vehicle 100 may include a first LIDAR (e.g., first LIDAR 120) similar to the first LIDAR 200 and a second LIDAR (e.g., second LIDAR 122) similar to the second LIDAR 300. In the scenario, the vehicle may utilize data from the first LIDAR to generate the 3D representation 292 of FIG. 2C. Further, in the scenario, the vehicle may determine that the region 296 of the 3D representation 292 as a region of interest for further scanning. In turn, the vehicle in the scenario may adjust a viewing direction of the second LIDAR to scan the region of interest and obtain the 3D representation 392 of FIG. 3B. In the scenario, the vehicle may process the 3D representation 392 using a computing process such as an image processing algorithm or a shape detection algorithm. In turn, the vehicle of the scenario may identify an object in region 396 of the 3D representation 392 as a pedestrian, and another object in region 398 as a light post. In the scenario, the vehicle may then navigate accordingly. In one instance, the vehicle may navigate to be within a first threshold distance to the objects if the objects include a pedestrian (e.g., as indicated by region 396), or a lower second threshold distance if the objects include inanimate objects such as the light post (e.g., indicated by region 398) among other possibilities. In another instance, the vehicle may assign the second LIDAR to track the objects if an animate object is identified (e.g., region 396), or may assign the second LIDAR to track other objects if only inanimate objects were identified. Other navigational operations are possible in line with the scenario.

Thus, in some examples, a vehicle that includes a combination of LIDARs such as the LIDAR 200 and the LIDAR 300 may utilize the respective characteristics of each LIDAR such as refresh rate, resolution, FOV, position, etc., to scan the environment according to various road conditions and/or scenarios.

Figure 4A:
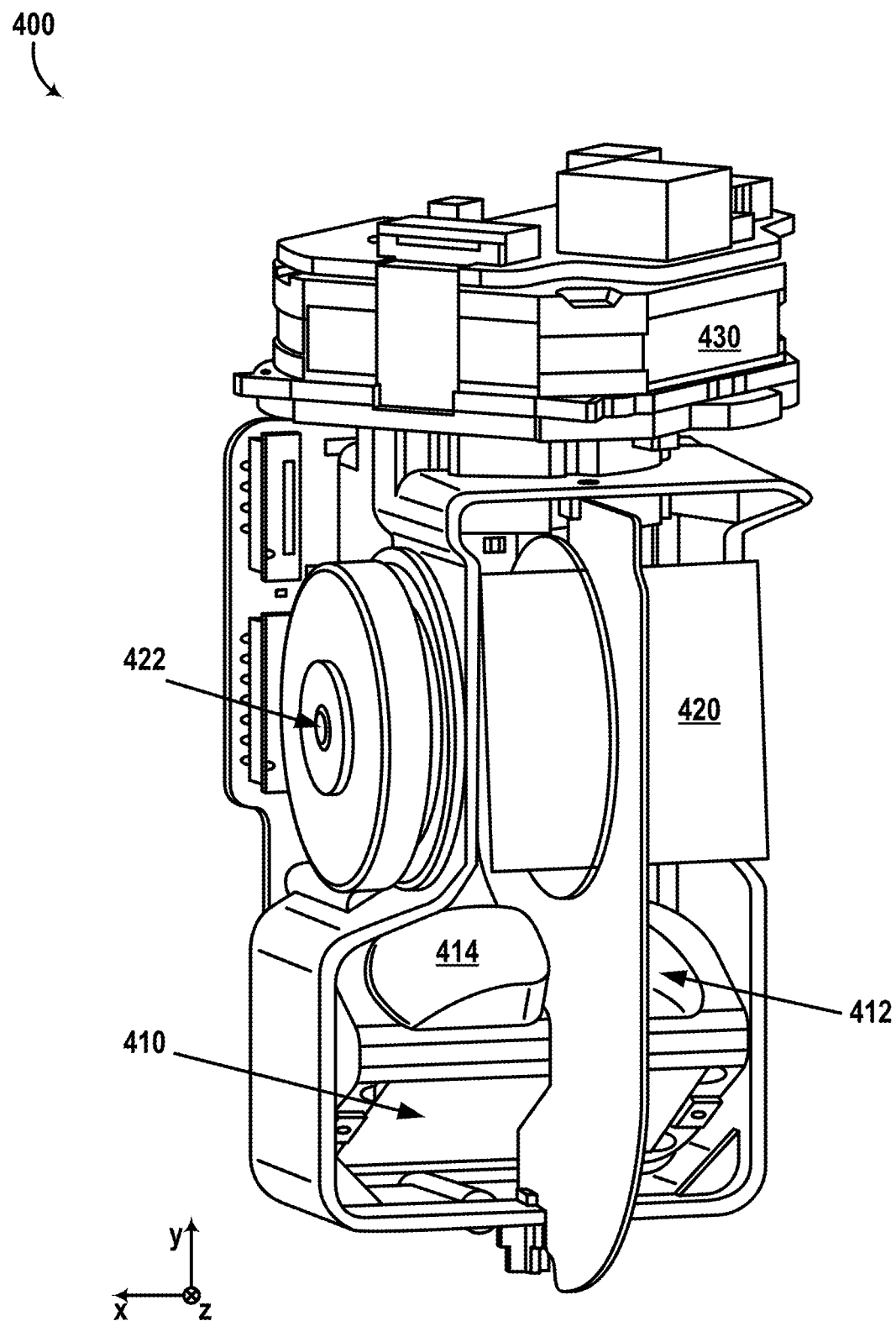
FIG. 4A illustrates a third LIDAR, according to an example embodiment.

FIG. 4A illustrates a third LIDAR 400, according to an example embodiment. In some examples, the third LIDAR 400 may be similar to the first LIDAR 120 of FIG. 1B, the second LIDAR 122 of FIG. 1B, the third LIDAR 130 of FIG. 1C, and/or any other LIDAR mounted to a vehicle such as the vehicle 100. For example, the third LIDAR 400 may be mounted at a front side of a vehicle similarly to the third LIDAR 130 of the FIG. 1C, or to any other side of the vehicle (e.g., in sensor units 106, 108, 110, etc., of the vehicle 100). As shown, the third LIDAR 400 includes an optics assembly 410, a transmit lens 412, a receive lens 414, a mirror 420, a pin 422, and a motor 430. For purposes of illustration, FIG. 4A shows an x-y-z axis, in which the z-axis is pointing out of the page, and the x-axis and y-axis define a horizontal plane along the surface of the page.

Similarly to the second LIDAR 300, in some examples, the third LIDAR 400 may emit light that propagates away from the mirror 420 along a viewing direction of the third LIDAR 400 (e.g., parallel to z-axis shown in FIG. 4A, etc.) toward an environment of the third LIDAR 400, and may receive reflected light from one or more objects in the environment.

Accordingly, the optics assembly 410 may be configured to emit light pulses towards the mirror 420 that are then reflected by the mirror 420 towards the environment. Further, the optics assembly 410 may be configured to receive reflected light that is reflected off the mirror 420. In one embodiment, the optics assembly 310 may include a single laser emitter that is configured to provide a narrow beam having a wavelength of 905 nm. In other embodiments, the optics assembly 410 may include multiple light sources similarly to the LIDAR 200 of FIGS. 2A-2B. As shown, the optics assembly 410 includes the transmit lens 412 for collimation and/or focusing of emitted light from the optics assembly 410 onto the mirror 420, and a receive lens 414 for focusing reflected light from the mirror 420 onto one or more detectors (not shown) of the optics assembly 410. However, in some examples, the optics assembly 410 may alternatively include a single lens for both collimation of emitted light and focusing of reflected light similarly to the lens 250 of the first LIDAR 200.

Similarly to the mirror 320 of the second LIDAR 300, the mirror 420 of the third LIDAR 400 may be arranged to steer emitted light from the transmit lens 412 towards the viewing direction of the LIDAR 400 as illustrated in FIG. 4A. Further, for example, the mirror 420 may be arranged to steer reflected light from the mirror 420 towards the receive lens 414. However, in some examples, unlike the mirror 320, the mirror 420 may be a triangular mirror that performs complete rotations about an axis defined by the pin. In these examples, the mirror 420 may allow reflecting the emitted light from the optics assembly 410 over a wider vertical FOV than the second LIDAR 300. In one embodiment, the vertical FOV of the third LIDAR 400 is 110°, similarly to the third LIDAR 130 of FIG. 1C.

The pin 422 may be configured to mount the mirror 420 to the LIDAR device 400. In turn, the pin 422 can be formed from any material capable of supporting the mirror 420. For example, the pin 422 may be formed from a solid material such as plastic or metal among other possibilities. In some examples, the LIDAR 400 may be configured to rotate the mirror 420 about the pin 422 for complete rotations to steer emitted light from the optics assembly 410 vertically. However, in other examples, the LIDAR 400 may be configured to rotate the mirror 420 about the pin 422 over a given range of angles to steer the emitted light, similarly to the LIDAR 300. Thus, in some examples, various vertical FOVs are possible by adjusting the rotation the mirror 420 about the pin 422.

The motor 430 may include any motor such as a stepper motor, an electric motor, a combustion motor, a pancake motor, and/or a piezoelectric actuator among other possibilities. In some examples, the motor 430 may be configured to rotate various components of the LIDAR 400 (e.g., optics assembly 410, mirror 420, pin 422, etc.) about an axis of the LIDAR device 400. For example, the axis may be substantially vertical similarly to the y-axis shown in FIG. 4A. By rotating the various components of the LIDAR 400 about the axis, in some examples, the motor 430 may steer the emitted light from that is reflected off the mirror 420 horizontally, thus allowing the LIDAR 400 to have a horizontal FOV. In one embodiment, the motor 430 may rotate for a defined amount of rotation such as 270°. In this embodiment, the LIDAR 400 may thus have a horizontal FOV of 270°, similarly to the third LIDAR 130 of FIG. 1C. However, other amounts of rotation are possible as well (e.g., 360° similarly to the first LIDAR 120, 8° similarly to the second LIDAR 122, etc.) thereby allowing a different horizontal FOV for the LIDAR 400. Thus, in some examples, the LIDAR 400 may provide an alternative device for scanning the environment or a portion thereof to the device of the LIDAR 200 of FIGS. 2A-2B, and/or the LIDAR 300 of FIG. 3A.

Figure 4B:
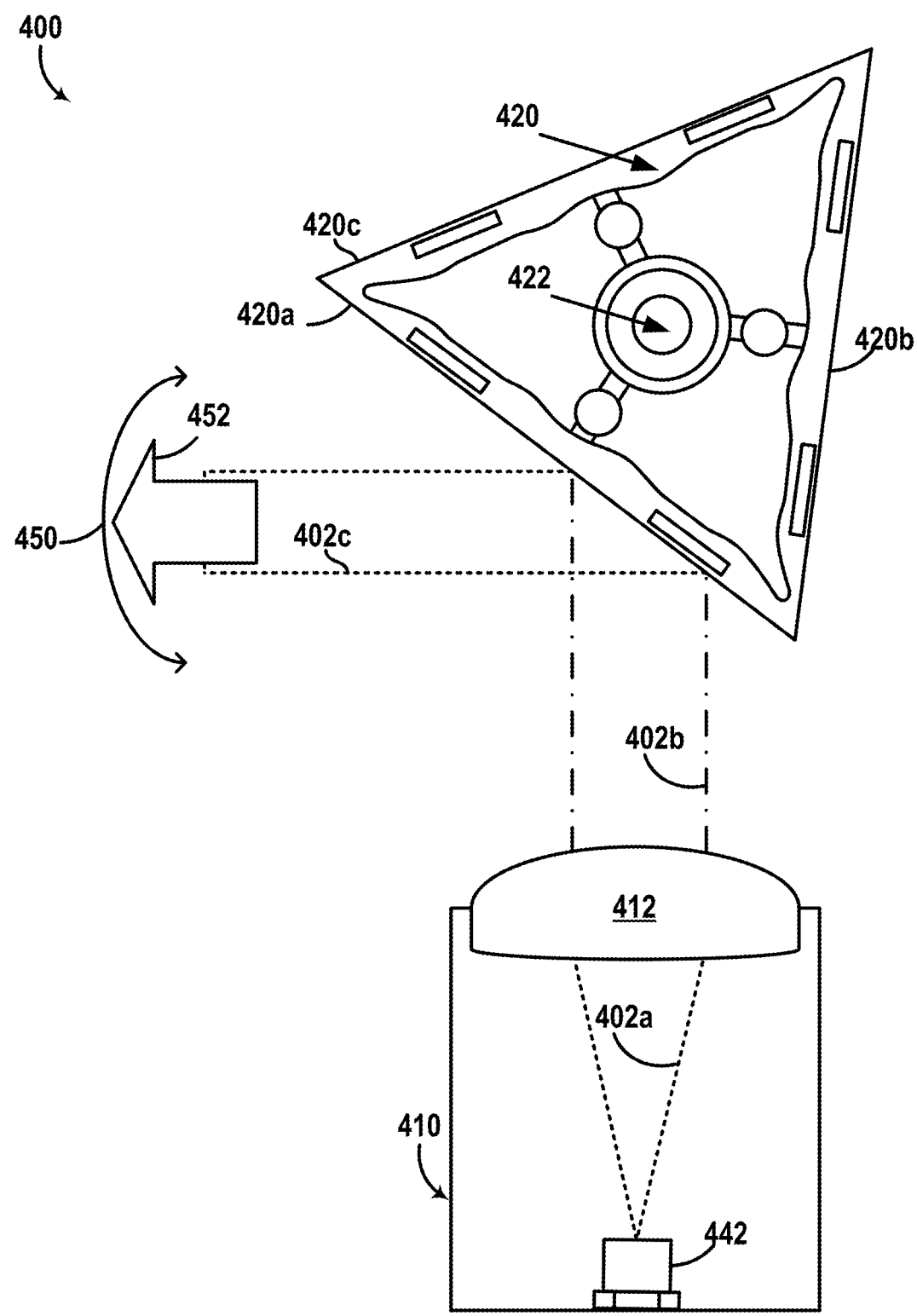
FIG. 4B illustrates a partial cross-section view of the third LIDAR of FIG. 4A.

FIG. 4B illustrates a partial cross-section view of the third LIDAR 400 shown in FIG. 4A. It is noted that some of the components of the third LIDAR 400 are omitted from the illustration of FIG. 4B for convenience in description.

As shown, the optics assembly 410 includes a light source 422. The light source 422 may be configured to emit one or more light pulses (e.g., laser beams, etc.) towards the transmit lens 412. For example, as shown, emitted light 402a propagates away from the light source 442 towards the transmit lens 412. In some examples, the light source 422 may be similar to the light sources 222a-c of the LIDAR 200 of FIG. 2B. In one embodiment, the light source 422 may be configured to emit light pulses having a wavelength of 905 nm.

In line with the discussion above, the transmit lens 412 may be configured to collimate the emitted light 402a into one or more collimated light beams 402b and/or may be configured to focus the emitted light 402a as the focused light 402b onto the mirror 420.

In some examples, the mirror 420 may be a triangular mirror as shown that has three reflective surfaces 420a, 420b, 420c. However, in other examples, the mirror 420 may alternatively include more than three reflective surfaces. In the configuration shown in FIG. 4B, the collimated light 402b may then reflect off the reflective surface 402a and into the environment of the LIDAR 400 as emitted light 402c. For example, a direction of the emitted light 402c is illustrated in FIG. 4B by arrow 452. Further, as the mirror 420 is rotated about an axis defined by the pin 422, the emitted light 402c may be steered to have a different direction than that illustrated by arrow 452. For example, the direction 452 of the emitted light 402c may instead correspond to a different direction along arrow 450. Thus, by rotating the mirror 420 about the pin 422, the LIDAR 400 may be configured to have a vertical FOV, for example.

Consider by way of example a scenario where the mirror 420 is configured to rotate about an axis defined by the pin 422 continuously in a clock-wise direction. In this scenario, the direction 452 of the emitted light 402c may thereby be adjusted also in a clock-wise direction as illustrated by the arrow 450 until the focused light 402b is reflecting off an edge of the reflective surface 420a. At this point, the emitted light 402c would be directed towards a maximum extent of the vertical FOV of the LIDAR 400. Continuing with the scenario, as the mirror 420 continues to rotate, the collimated light 402b may then be focused onto the reflective surface 420b instead of the reflective surface 420a. At this point, the reflected light 402c may be steered to a direction that is towards a minimum extent of the vertical FOV of the LIDAR 400. Continuing with the scenario, as the mirror 420 continues to rotate, the direction of the emitted light 402c may then be adjusted in a clock-wise direction towards the maximum extent of the vertical FOV that corresponds to the light 402b being focused onto another edge of the reflective surface 420b. Similarly, continuing with the scenario, the direction of the emitted light 402c may then be adjusted to scan the vertical FOV of the LIDAR 400 by reflecting the light 402b off the reflective surface 420c instead of the reflective surface 420b. Through this process, for example, the LIDAR 400 may continuously scan the vertical FOV. As a variation of the scenario above by way of example, the mirror 420 may be alternatively configured to rotate within a given range of angles (e.g., wobble, etc.) to define a narrower vertical field-of-view than that of the scenario described above. Other configurations for rotation of the mirror 420 are possible as well.

Figure 4C:
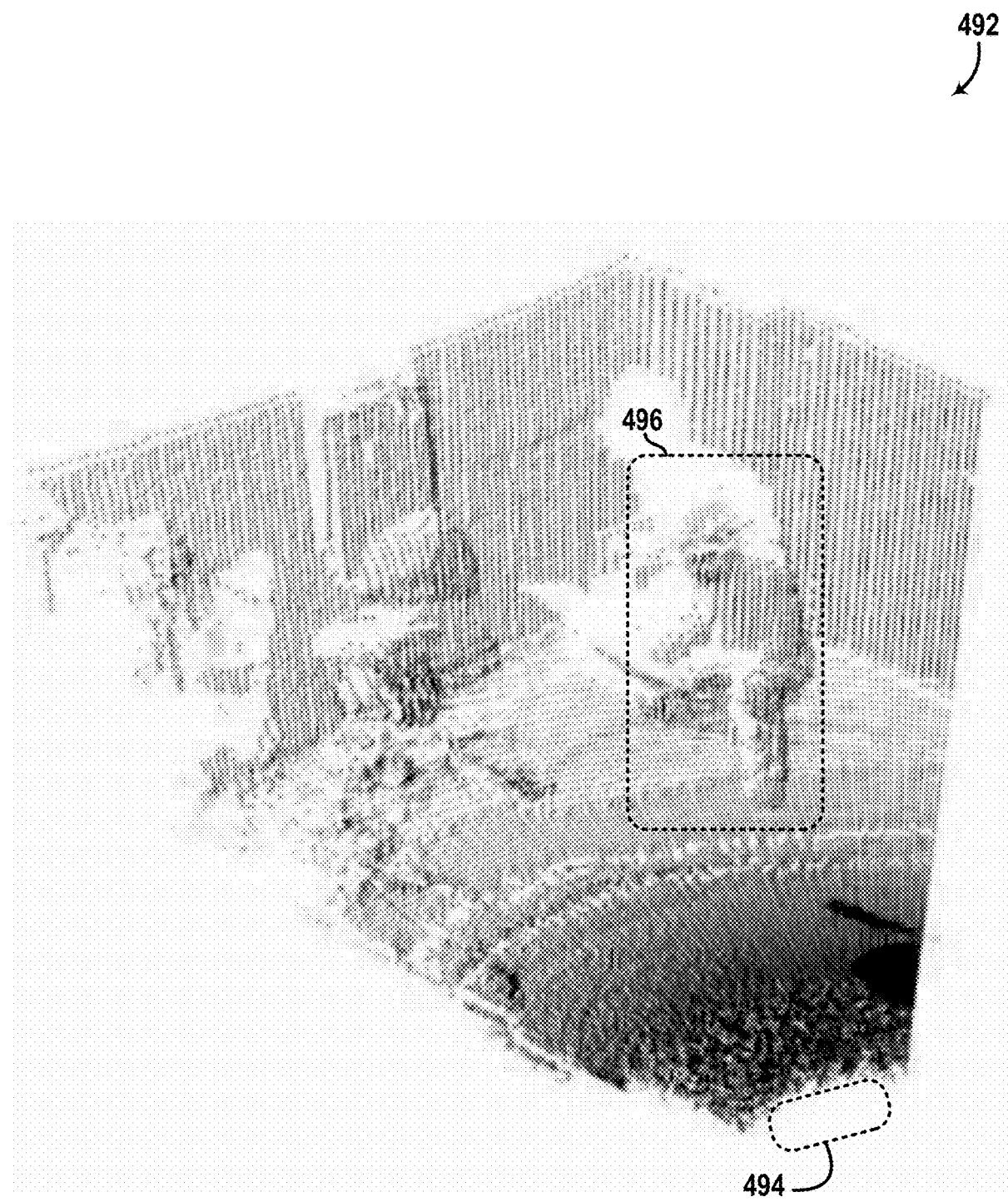
FIG. 4C illustrates a three-dimensional representation of an environment based on data from the third LIDAR of FIG. 4A, according to an example embodiment.

FIG. 4C illustrates a 3D representation 492 of an environment based on data from the third LIDAR 400 of FIG. 4A, according to an example embodiment. In some examples, the 3D representation 492 may be generated, similarly to the 3D representation 292 and/or the 3D representation 392, by a computing device as a 3D point cloud based on the data from the third LIDAR 400. Each point of the 3D cloud, for example, may be associated with a reflected light pulse from an object in the environment of the LIDAR 400.

As shown, the 3D representation 492 includes a region 494, similar to the region 294 of the 3D representation 292 and/or the region 394 of the 3D representation 392, that may be an unscanned region due to extents of the FOV of the third LIDAR 400 and/or positioning of the LIDAR 400 (e.g., at a given side of the vehicle other than the top side). However, as shown, the region 494 is much smaller than the regions 294 and 394. Thus, the LIDAR 400 may be advantageous for scanning nearby objects similarly to the third LIDAR 130 of FIG. 1C.

Unlike the 3D representation 392, however, the 3D representation 492 spans a much wider field-of-view. For example, the FOV scanned by the LIDAR 400 and illustrated in the 3D representation 492 may correspond to the contour 166 of FIG. 1E. Due in part to the wider FOV, the 3D representation 492 has a lower resolution than the 3D representation 392. For instance, as shown, points in the point cloud are further from one another in the 3D representation 492 compared to points in the point cloud of the 3D representation 392. However, in some examples, the lower resolution may be sufficient to scan the environment for objects within a short range of distances to the third LIDAR 400. As shown, for example, a computing device (e.g., vehicle processor, remote server, etc.) may be utilized to detect a nearby pedestrian by analyzing region 496 of the 3D representation 492.

Thus, in some examples, a vehicle that includes a combination of LIDARs such as the LIDAR 200, the LIDAR 300, and/or the LIDAR 400 may utilize the respective characteristics of each LIDAR such as refresh rate, resolution, FOV, position, etc., to scan the environment according to various road conditions and/or scenarios.

Figure 5:
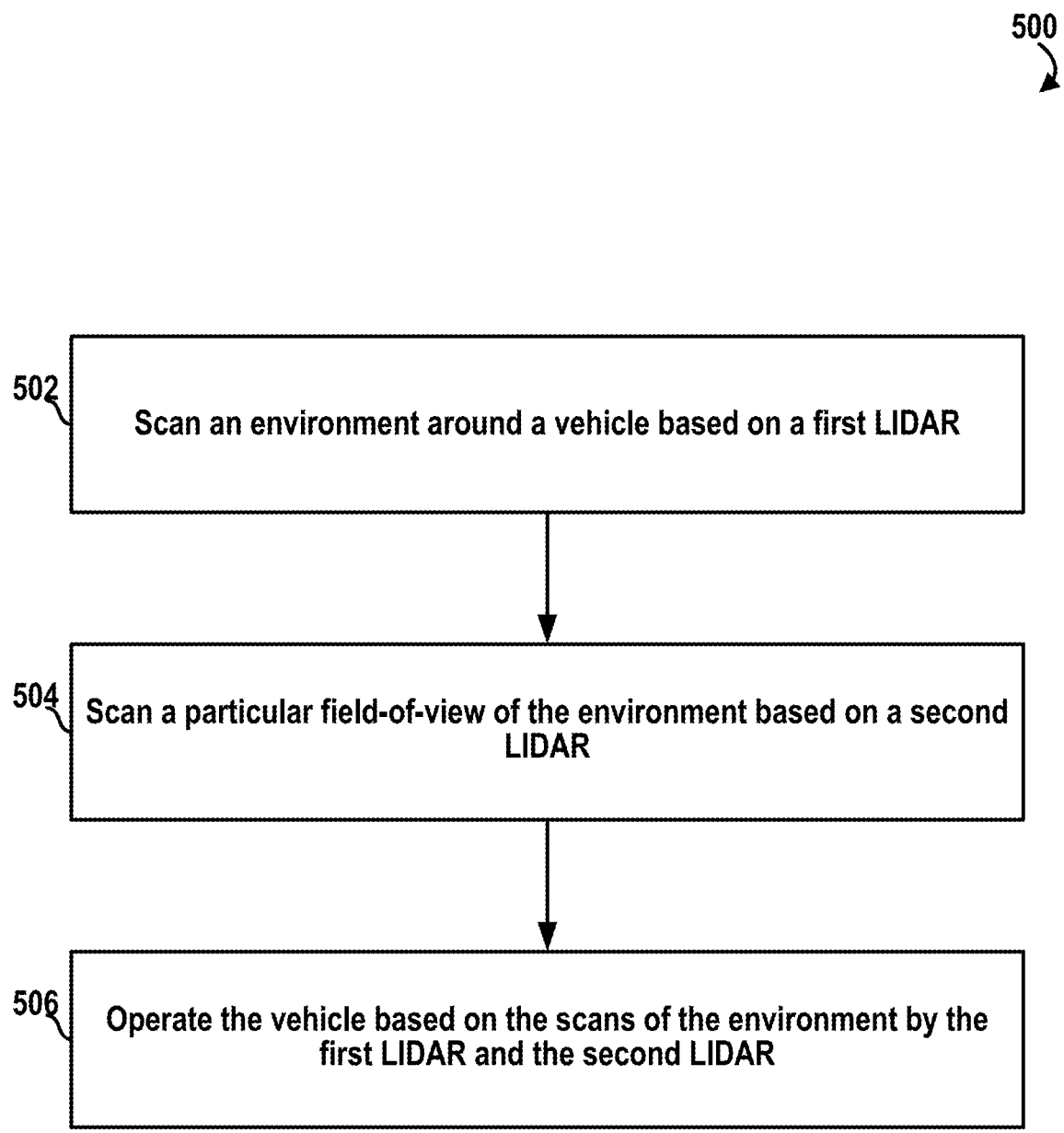
FIG. 5 is a flowchart of a method, according to an example embodiment.

FIG. 5 is a flowchart of a method 500, according to an example embodiment. Method 500 shown in FIG. 5 presents an embodiment of a method that could be used with any of the vehicle 100, the LIDARs 120, 122, 130, 200, 300, and/or 400, for example. Method 500 may include one or more operations, functions, or actions as illustrated by one or more of blocks 502-506. Although the blocks are illustrated in a sequential order, these blocks may in some instances be performed in parallel, and/or in a different order than those described herein. Also, the various blocks may be combined into fewer blocks, divided into additional blocks, and/or removed based upon the desired implementation.

In addition, for the method 500 and other processes and methods disclosed herein, the flowchart shows functionality and operation of one possible implementation of present embodiments. In this regard, each block may represent a module, a segment, a portion of a manufacturing or operation process, or a portion of program code, which includes one or more instructions executable by a processor for implementing specific logical functions or steps in the process. The program code may be stored on any type of computer readable medium, for example, such as a storage device including a disk or hard drive. The computer readable medium may include non-transitory computer readable medium, for example, such as computer-readable media that stores data for short periods of time like register memory, processor cache and Random Access Memory (RAM). The computer readable medium may also include non-transitory media, such as secondary or persistent long term storage, like read only memory (ROM), optical or magnetic disks, compact-disc read only memory (CD-ROM), for example. The computer readable media may also be any other volatile or non-volatile storage systems. The computer readable medium may be considered a computer readable storage medium, for example, or a tangible storage device.

In addition, for the method 500 and other processes and methods disclosed herein, each block in FIG. 5 may represent circuitry that is wired to perform the specific logical functions in the process.

In some examples, the method 500 and other methods herein may be performed by a computing system in a vehicle such as the vehicle 100. In other examples, the method 500 and other methods herein may be performed by a remote system communicatively linked to a vehicle such as the vehicle 100 to provide operation instructions to the vehicle. In yet other examples, the method 500 and other methods herein may be performed by several computing systems in communication with one another such as multiple vehicles or multiple processors on a single vehicle. In still other examples, the method 500 and other methods herein may be performed by one or more LIDARs mounted to a vehicle such as the vehicle 100. Thus, in some examples, the method 500 and other methods herein may facilitate autonomous operation of a vehicle and/or assist in manual operation of a vehicle (e.g., for accidence avoidance).

At block 502, the method 500 involves scanning an environment around the vehicle based on a first light detection and ranging device (LIDAR). In some examples, the first LIDAR may be positioned at a top side of the vehicle and configured to rotate about an axis, similarly to the first LIDAR 120 of FIG. 1B. For example, the first LIDAR may be included in a sensor unit mounted to the top side of the vehicle, such as the sensor unit 102 of FIG. 1A. In some examples, the vehicle may include one or more wheels that are positioned at a bottom side of the vehicle opposite to the top side, similarly to the wheel 112 of the vehicle 100. The first LIDAR may have a first resolution. The first resolution, for example, may be suitable for scanning the environment around the vehicle for objects within a medium range of distances to the vehicle (e.g., 100 meters, etc.), similarly to the LIDAR 200 of FIGS. 2A-2B.

At block 504, the method 500 involves scanning a particular field-of-view (FOV) of the environment based on a second LIDAR. The particular FOV may extend away from the vehicle along a viewing direction of the second LIDAR. In one example, the second LIDAR may be positioned adjacent to the first LIDAR at the top side of the vehicle. For instance, the second LIDAR may be similar to the second LIDAR 122 of FIG. 1B that is included in the sensor unit 102 mounted to the top side of the vehicle 100. In this instance, the second LIDAR may have a narrow field-of-view that corresponds to the contour 164 of FIG. 1E. Thus, in this example, the second LIDAR may be suitable for scanning the environment for objects within a long range of distances (e.g., 300 meters, etc.) to the vehicle. In another example, the second LIDAR may be positioned at a given side other than the top side. In one instance, the second LIDAR may be similar to the third LIDAR 130 of FIG. 1C that is included in the sensor unit 104 mounted to the front side of the vehicle 100. In another instance, the second LIDAR may be included in any of the sensor units 106, 108, 110 that are mounted, respectively, to the back side, right side, and/or left side of the vehicle 100. Thus, in this example, the second LIDAR may be suitable for scanning the environment for objects within a short range of distances (e.g., 30 meters, etc.) to the vehicle.

In some examples, the method 500 may also involve adjusting the viewing direction of the second LIDAR based on data received from the first LIDAR. In one example, the data received from the first LIDAR may indicate a moving object in the environment, such as a car. In this example, the method 500 may include adjusting the viewing direction of the second LIDAR to focus on the moving object and/or track the moving object using given data from the second LIDAR. For instance, the given data from the second LIDAR may provide a greater resolution (e.g., the second resolution), range, and/or refresh rate suitable for tracking the moving object. In another example, the data received from the first LIDAR may indicate detection of an object that is difficult to identify due to the first resolution of the first LIDAR. In this example, the method 500 may include adjusting the viewing direction of the second LIDAR to scan the unidentified object and facilitate identification of the object using the greater resolution of the second LIDAR. Other examples are possible as well in line with the discussion above.

Accordingly, in some examples, the method 500 may also involve determining a three-dimensional (3D) representation of the environment based on data from the first LIDAR having the first resolution. In an example scenario, the 3D representation may be similar to the 3D representation 292 of the LIDAR 200. Further, in some examples, the method 500 may also involve identifying a portion of the 3D representation for scanning by the second LIDAR. Continuing with the example scenario, the portion may correspond to the region 296 of the 3D representation 292. As shown in FIG. 2C, according to the scenario, the region 296 may include various objects that are difficult to identify due to the first resolution of the first LIDAR. Accordingly, in some examples, the method 500 may also include adjusting the viewing direction of the second LIDAR to correspond to a FOV of the environment associated with the identified portion of the 3D representation. Continuing with the example scenario, the viewing direction may be adjusted to the FOV that includes the objects in the region 296. For instance, in the scenario, such FOV may correspond to the FOV illustrated in the 3D representation 392 of FIG. 3B. In turn, in some examples, the method 500 may also involve updating the portion of the 3D representation to have the second resolution of the second LIDAR based on given data from the second LIDAR. Continuing with the example scenario, the given data from the second LIDAR may allow generating a higher resolution 3D representation for the portion of the environment similarly to the 3D representation 392. In turn, for instance, the portion of the 3D representation may be updated with the higher resolution data to facilitate identification of the objects such as the objects in regions 396 and 398 of the 3D representation 392.

In some examples, the method 500 may also involve detecting a first object in the environment within a threshold distance to the vehicle based on first data from the first LIDAR. The threshold distance may be based on the first resolution of the first LIDAR. For instance, the threshold distance may correspond to a medium range of distances where the first resolution of the first LIDAR may allow detection and/or identification of objects within the medium range. Referring back to FIG. 1E by way of example, the threshold distance may correspond to the contour 162, and thus the first object may include any object between the contours 160 and 162 similarly to the first LIDAR 120 of the vehicle 100. Further, in some examples, the method 500 may also involve detecting a second object in the environment at a given distance to the vehicle greater than the threshold distance. Detection of the second object at the given distance may be based on the second resolution of the second LIDAR. Continuing with the example of FIG. 1E, the second object may be included within the contour 164 beyond the threshold distance indicated by the contour 162. Due to the higher resolution of the second LIDAR, for instance, objects within such region may be detected and/or identified using the second data from the second LIDAR.

At block 506, the method 500 involves operating the vehicle based on the scans of the environment by the first LIDAR and the second LIDAR. By way of example, the vehicle may be operated in an autonomous mode. In this example, the vehicle may generate 3D maps of the environment or portions thereof similarly to the 3D representations 292, 392, and/or 492. In turn, the vehicle may utilize the 3D maps to navigate the vehicle (e.g., adjust speed, direction, etc.) safely by avoiding obstacles among other possibilities. The obstacles or objects, for example, may be detected using an image processing algorithm or other computing method to analyze the 3D maps and detect or identify the various obstacles or objects. As another example, the vehicle may be operated in a partially autonomous or manual mode. In this example, the vehicle may notify a driver or operator of the vehicle of the presence or distance to various objects or changing road conditions (e.g., street lights, street signs, etc.).

In some examples, the method 500 may also involve scanning a given FOV of the environment extending away from a given side of the vehicle other than the top side based on a third LIDAR positioned along the given side. For instance, the third LIDAR may be similar to the third LIDAR 130 of FIG. 1C that is included in sensor 104 that is mounted to the front side of the vehicle 100 of FIG. 1A. Alternatively, for instance, the third LIDAR may be another LIDAR mounted to another side, such as a LIDAR included in the sensor units 106, 108, and/or 110 of the vehicle 100. The third LIDAR, for instance, may be suitable for scanning the environment for objects close to the vehicle within a short range of distances (e.g., 30 meters, etc.). In these examples, the method 500 at block 506 may involve operating the vehicle based also on the third LIDAR. Thus, in some examples, the method 500 may involve scanning various portions of the environment around the vehicle, such as the regions indicated by contours 162, 164 and/or 166 of FIG. 1E, using the first LIDAR, the second LIDAR, and the third LIDAR in line with the discussion above.

Figure 6:
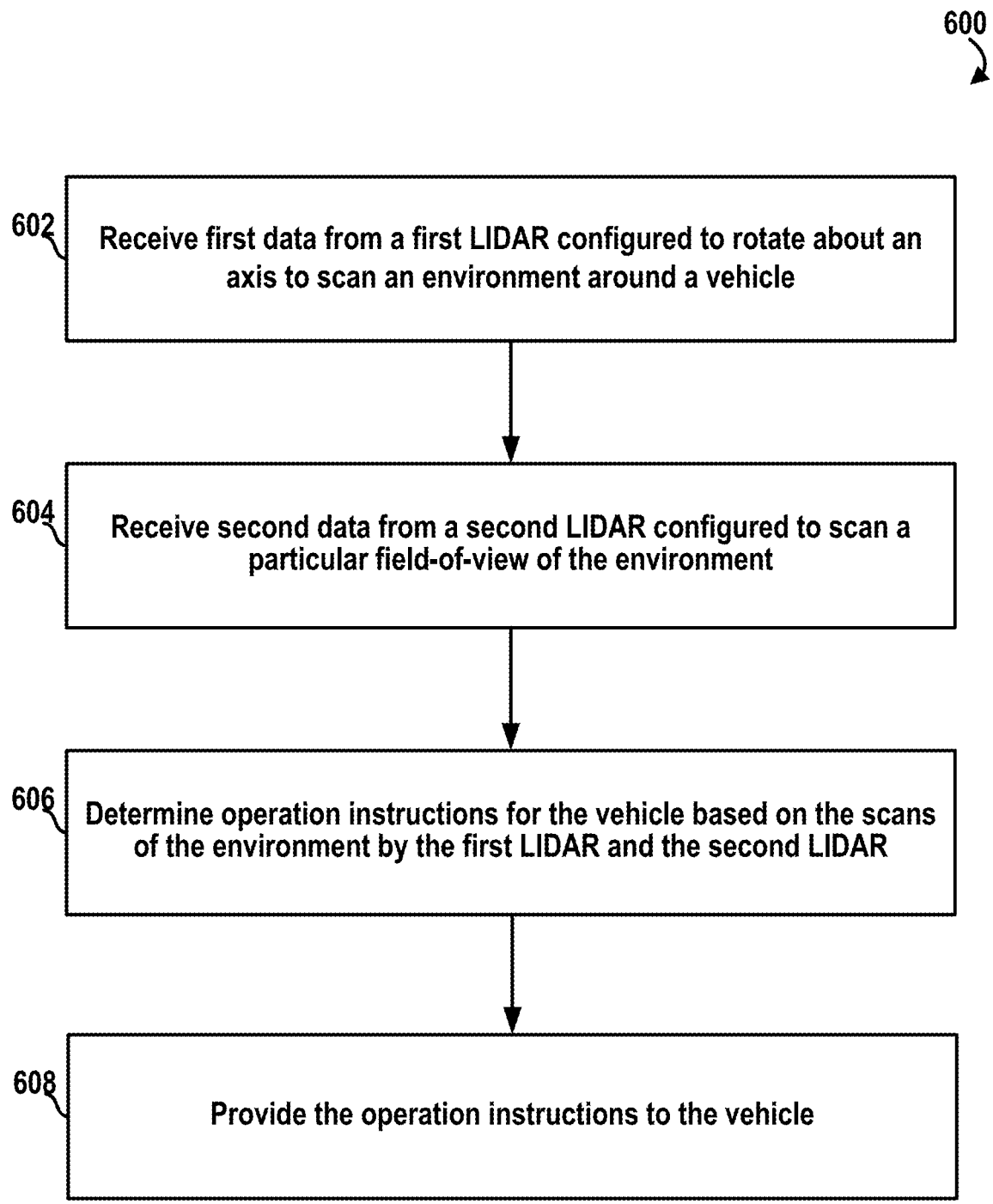
FIG. 6 is a flowchart of another method, according to an example embodiment.

FIG. 6 is a flowchart of another method 600, according to an example embodiment. Method 600 shown in FIG. 6 presents an embodiment of a method that could be used with any of the vehicle 100, the LIDARs 120, 122, 130, 200, 300, 400, for example. Method 600 may include one or more operations, functions, or actions as illustrated by one or more of blocks 602-608. Although the blocks are illustrated in a sequential order, these blocks may in some instances be performed in parallel, and/or in a different order than those described herein. Also, the various blocks may be combined into fewer blocks, divided into additional blocks, and/or removed based upon the desired implementation.

At block 602, the method 600 involves receiving first data from a first LIDAR configured to rotate about an axis to scan an environment around the vehicle. The first LIDAR may be similar to the first LIDAR at block 502 of the method 500. For example, the first LIDAR may be positioned at a top side of the vehicle, similarly to the first LIDAR 120 of FIG. 1B. For instance, the first LIDAR may be included in a sensor unit mounted to the top side of the vehicle, such as the sensor unit 102 of FIG. 1A. In some examples, the vehicle may include one or more wheels that are positioned at a bottom side of the vehicle opposite to the top side, similarly to the wheel 112 of the vehicle 100. The first LIDAR may have a first resolution. The first resolution, for example, may be suitable for scanning the environment around the vehicle for objects within a medium range of distances to the vehicle (e.g., 100 meters, etc.), similarly to the LIDAR 200 of FIGS. 2A-2B.

Thus, for instance, the first data from the first LIDAR may be received by a computing device included in the vehicle, or may be received by an external computing device in communication with the vehicle.

At block 604, the method 600 involves receiving second data from a second LIDAR configured to scan a particular FOV of the environment. The particular FOV may extend away from the vehicle along a viewing direction of the second LIDAR. In one example, the second LIDAR may be positioned adjacent to the first LIDAR at the top side of the vehicle. For instance, the second LIDAR may be similar to the second LIDAR 122 of FIG. 1B that is included in the sensor unit 102 mounted to the top side of the vehicle 100. In this instance, the second LIDAR may have a narrow field-of-view that corresponds to the contour 164 of FIG. 1E. Thus, in this example, the second LIDAR may be suitable for scanning the environment for objects within a long range of distances (e.g., 300 meters, etc.) to the vehicle. In another example, the second LIDAR may be positioned at a given side other than the top side. In one instance, the second LIDAR may be similar to the third LIDAR 130 of FIG. 1C that is included in the sensor unit 104 mounted to the front side of the vehicle 100. In another instance, the second LIDAR may be included in any of the sensor units 106, 108, 110 that are mounted, respectively, to the back side, right side, and/or left side of the vehicle 100. Thus, in this example, the second LIDAR may be suitable for scanning the environment for objects within a short range of distances (e.g., 30 meters, etc.) to the vehicle.

Similarly to the first data at block 602, the second data from the second LIDAR may be received by a computing device included in the vehicle, or may be received by an external computing device in communication with the vehicle.

In some instances, the method 600 may also involve determining a 3D representation of the environment based on the first data from the first LIDAR. The 3D representation may have the first resolution of the first LIDAR. By way of example, the 3D representation may be similar to the 3D representation 292 of FIG. 2C. In these instances, the method 600 may also involve detecting one or more objects in the environment based on the 3D representation. Continuing with the example, the one or more objects may be similar to the objects in region 296 of the 3D representation 292. Further, in these instances, the method 600 may involve adjusting the viewing direction of the second LIDAR to correspond to a FOV of the environment that includes the one or more objects. In turn, for instance, the method 600 may also involve determining a given 3D representation of the one or more objects based on the second data from the second LIDAR responsive to adjusting the viewing direction. The given 3D representation may have the second resolution of the second LIDAR. Continuing with the example, the given 3D representation may be similar to the 3D representation 392 of FIG. 3B, and may thus have the higher second resolution of the second LIDAR. Thus, in these instances, the method 600 may also involve identifying the one or more objects based on the given 3D representation having the second resolution, and operating the vehicle based on identifying the one or more objects. Continuing with the example, as shown in FIG. 3B, the one or more objects may correspond to the objects in region 396

(e.g., pedestrian) and region 398 (e.g., light post). Thus, in the example, the operation of the vehicle may be adjusted by navigating the vehicle away from the one or more objects, adjusting the speed of the vehicle according to a type of the identified one or more objects (e.g., lower speed if object is a pedestrian, etc.), and/or navigating the vehicle to have a threshold distance to the one or more objects that is based on the type of the one or more objects. Other examples are possible as well.

At block 606, the method 600 involves determining operation instructions for the vehicle based on the scans of the environment by the first LIDAR and the second LIDAR. In a first example, the operation instructions may include navigating the vehicle away from an obstacle in the environment. In a second example, the operation instructions may include adjusting a viewing direction of the second LIDAR to correspond to a FOV of the environment that includes a particular object. In a third example, the operation instructions may include causing a display or a speaker in the vehicle to present information regarding one or more objects in the environment. In a fourth example, the operation instructions may include adjusting configuration of various components of the vehicle (e.g., lights, cameras, etc.) in response to detection of objects or other road conditions based on the scans of the environment. Other examples are possible as well.

In some examples, the method 600 may also involve scanning a given FOV of the environment extending away from a given side of the vehicle other than the top side based on third data from a third LIDAR positioned along the given side. The third LIDAR, for example, may be similar to the third LIDAR 130 of FIG. 1C, and may have a third resolution suitable for detection of objects within a short range of distances to the vehicle. In these examples, determining the operation instructions at block 606 may be based also on the scan of the environment by the third LIDAR.

Further, in these examples, the method 600 may also involve detecting an object in the environment based on data from the first LIDAR, and identifying the object based on given data from the third LIDAR having the third resolution. For instance, where the object is close to the vehicle, the data from the first LIDAR may only indicate a portion of the object rather than the entire object (e.g., due to an unscanned portion of the environment similarly to region 294 of the 3D representation 292. In this instance, the method 600 may identify the object using the given data from the third LIDAR that has a FOV that includes the entire object.

Accordingly, in these examples, the method 600 may also involve determining that a given distance between the object and the vehicle is less than a threshold distance, and responsively obtaining the given data from the third LIDAR to identify the object. For instance, where the detected object is at the border of the unscanned region (e.g., region 294 of the 3D representation 292) and thus is at the given distance that is less than the threshold distance, the method 600 may operate the third LIDAR to obtain the given data to identify the object.

At block 608, the method 600 involves providing the operation instructions to the vehicle. In one example, where the determination of the operation instructions at block 606 is performed by an external computing device, providing the operation instructions at block 608 may involve the external computing device communicating the operation instructions to the vehicle (e.g., via a wireless or wired communication interface). In another example, where the determination at block 606 is performed by a controller included in the vehicle, providing the operation instructions may involve the controller providing signals to a navigation system or other control system of the vehicle to adjust operation of the vehicle according to the determined operating instructions. Other examples are possible as well in line with the discussion above.

Figure 7:
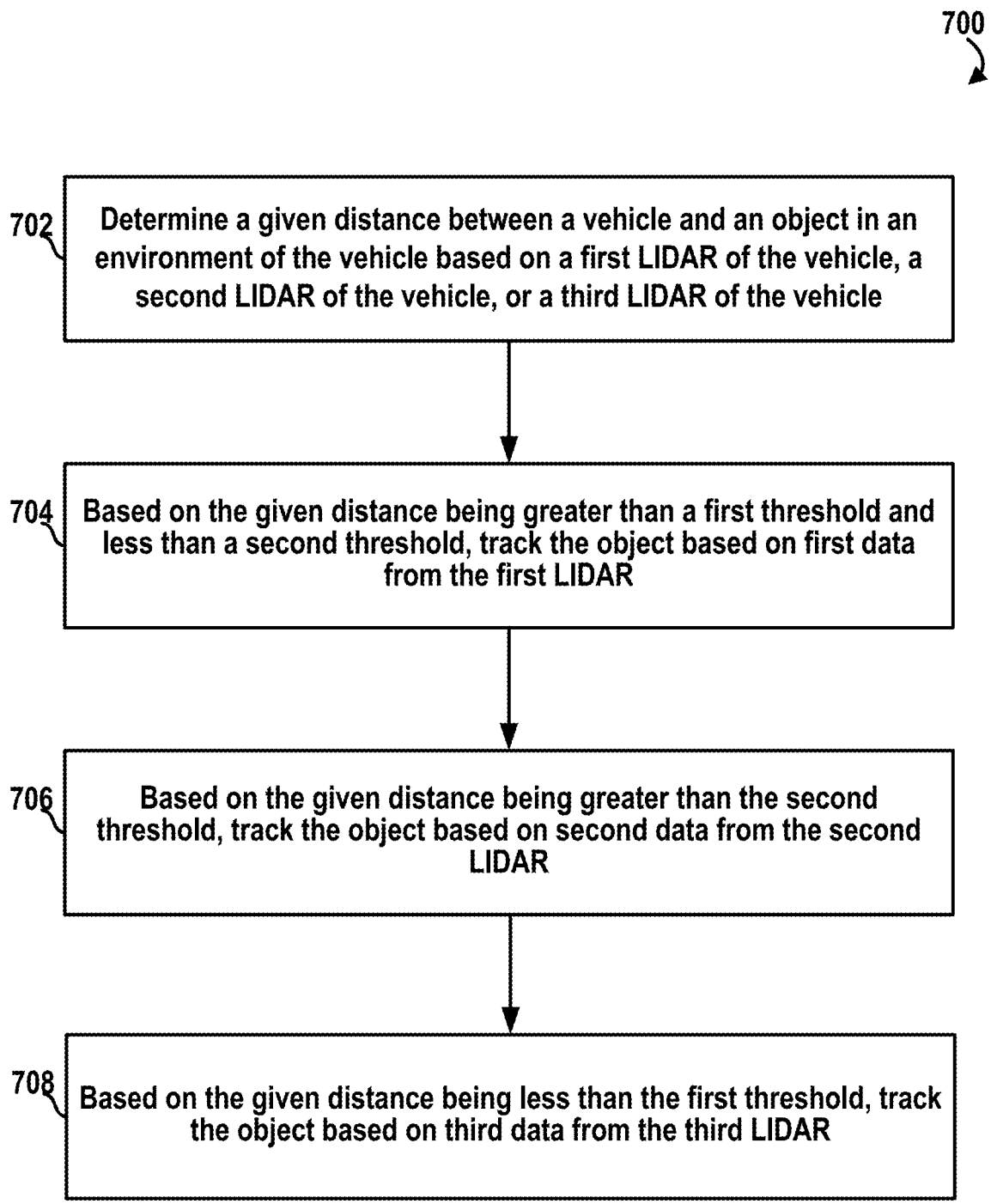
FIG. 7 is a flowchart of yet another method, according to an example embodiment.

FIG. 7 is a flowchart of yet another method 700, according to an example embodiment. Method 700 shown in FIG. 7 presents an embodiment of a method that could be used with any of the vehicle 100, the LIDARs 120, 122, 130, 200, 300, 400, for example. Method 700 may include one or more operations, functions, or actions as illustrated by one or more of blocks 702-708. Although the blocks are illustrated in a sequential order, these blocks may in some instances be performed in parallel, and/or in a different order than those described herein. Also, the various blocks may be combined into fewer blocks, divided into additional blocks, and/or removed based upon the desired implementation.

In some examples, the method 700 may be used in conjunction with the methods 500 and/or 600 to operate devices and systems herein, such as the vehicle 100 and/or the LIDARs 120, 122, 130, 200, 300, 400. In other examples, the method 700 may be used to operate the devices and the systems herein as an alternative method to the methods 500 and/or 600. Thus, in some examples, the method 700 may be an additional or alternative method to the methods 500 and/or 600.

At block 702, the method 700 involves determining a given distance between a vehicle and an object in an environment of the vehicle based on a first LIDAR of the vehicle, a second LIDAR of the vehicle, or a third LIDAR of the vehicle. In some examples, the first LIDAR, the second LIDAR, and the third LIDAR may be similar, respectively, to the first LIDAR 120, the second LIDAR 122, and the third LIDAR 130 of the vehicle 100. For example, the first LIDAR may be positioned at a top side of the vehicle and configured to rotate about an axis to scan the environment around the vehicle, the second LIDAR may be configured to scan a particular FOV of the environment along a viewing direction of the second LIDAR, and the third LIDAR may be positioned at a given side of the vehicle other than the top side to scan a given FOV of the environment that extends away from the given side. Further, for example, the first LIDAR may have a first resolution, the second LIDAR may have a second resolution, and the third LIDAR may have a third resolution such that each of the LIDARs is suitable for scanning the environment for various objects according to the respective characteristics of the respective LIDAR. For instance, the first LIDAR may be suitable for detection and/or identification of objects within a medium range of distances to the vehicle (e.g., between contours 160 and 162 of FIG. 1E), the second LIDAR may be suitable for detection and/or identification of objects within a long range of distances (e.g., within contour 164 of FIG. 1E), and the third LIDAR may be suitable for detection and/or identification of objects within a short range of distances (e.g., within contour 166 of FIG. 1E) among other possibilities.

Thus, in one example, the given distance may be determined using one or more 3D representations or point clouds that are determined based on data from the respective LIDAR. For instance, a given 3D representation may be similar to any of the 3D representations 292, 392, 492 illustrated, respectively, in FIGS. 2C, 3B, and 4C. In another example, the given distance may be determined by analyzing reflected light pulses from the object to detectors of the respective LIDARs in line with the discussion for LIDARs 200, 300, and/or 400.

At block 704, the method 700 involves tracking the object based on first data from the first LIDAR based on the given distance being greater than a first threshold and less than a second threshold. Referring back to FIG. 1E by way of example, the object may be tracked (e.g., position, motion, speed, direction, etc.) using the first data from the first LIDAR if the object is in the region between contours 160 and 162. In such region, the first resolution of the first LIDAR may be suitable for detection/identification of the object, and therefore suitable for tracking the object as well. Thus, in this example, the first threshold may correspond to the contour 160 and the second threshold may correspond to the contour 162. In some examples, the first data may be similar to the 3D representation 292 of FIG. 2C, or may be data received from the first LIDAR indicating time-of-flight or a shape/intensity of a reflected light pulse detected by the first LIDAR among other possibilities.

At block 706, the method 700 involves tracking the object based on second data from the second LIDAR based on the given distance being greater than the second LIDAR. Continuing with the example of FIG. 1E, the object may be tracked using the second data from the second LIDAR if the object is in the region beyond contour 162. For instance, the viewing direction of the second LIDAR may be adjusted accordingly to keep the object within a FOV of the second LIDAR, illustrated in FIG. 1E as contour 164. In some examples, the second data may be similar to the 3D representation 392 of FIG. 3B, or may be data received from the second LIDAR indicating time-of-flight or a shape/intensity of a reflected light pulse detected by the second LIDAR among other possibilities.

At block 708, the method 700 involves tracking the object based on third data from the third LIDAR based on the given distance being less than the first threshold. Continuing with the example of FIG. 1E, the object may be tracked using the third data from the third LIDAR if the object is in the region indicated by contour 166. Such region, for instance, includes a portion of the environment (e.g., within contour 160) that is unscanned by the first LIDAR and/or the second LIDAR due to positioning of the respective LIDARS at the top side of the vehicle. In some examples, the third data may be similar to the 3D representation 492 of FIG. 4C, or may be data received from the third LIDAR indicating time-of-flight or a shape/intensity of a reflected light pulse detected by the third LIDAR among other possibilities.

Thus, in an example scenario, the object may move between the various ranges of the various LIDARs, and the method 700 at blocks 704-708 may allow continuous tracking of the object using the respective characteristics of each of the first LIDAR, the second LIDAR, and the third LIDAR. Through this process, for example, the vehicle may utilize the method 700 to track the object as it moves among the various ranges of distances, and thereby facilitate autonomous operation (e.g., navigation) and/or accident avoidance.

Figure 8:
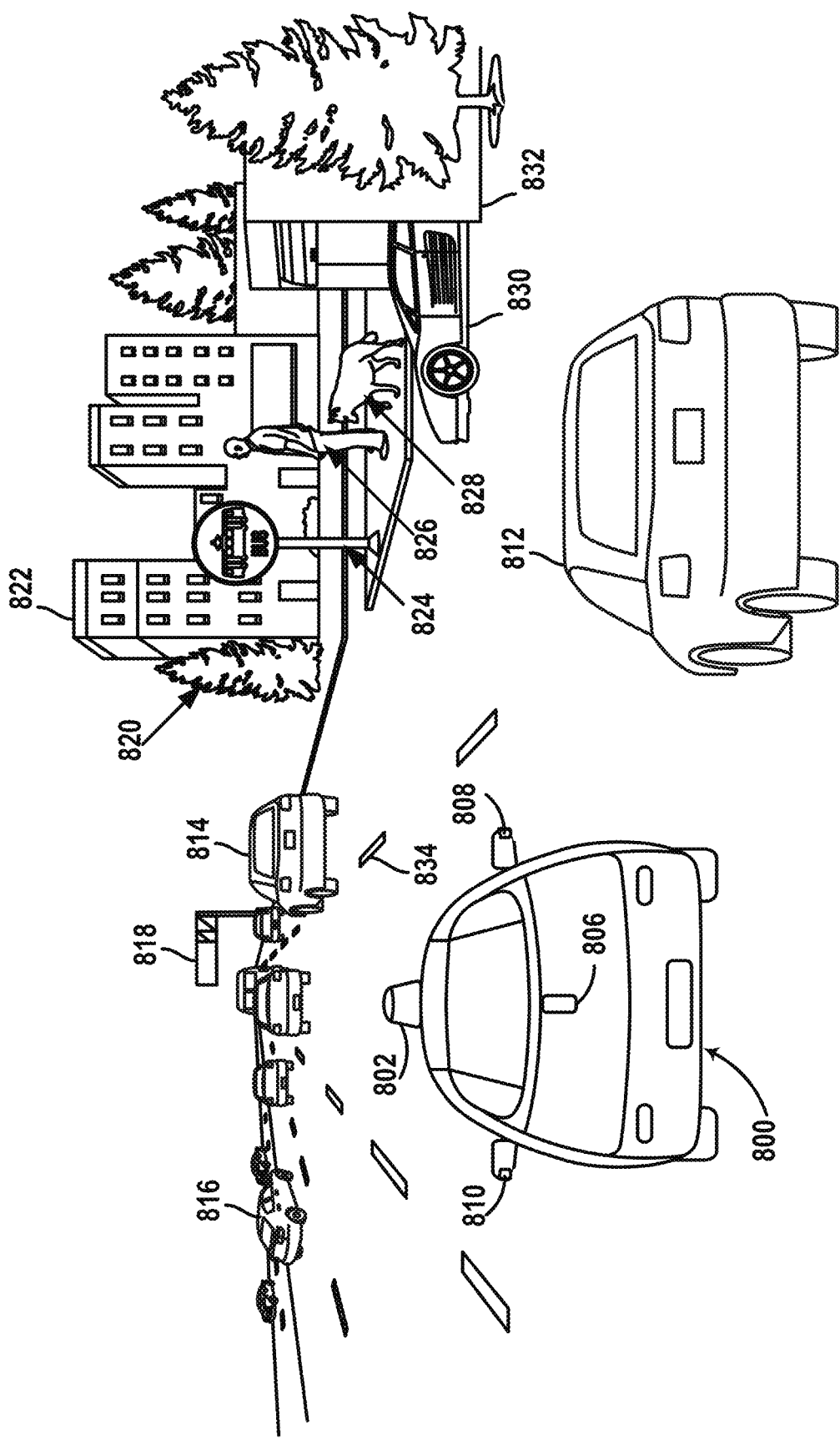
FIG. 8 illustrates a vehicle operating in an environment that includes one or more objects, according to an example embodiment.

FIG. 8 illustrates a vehicle 800 operating in an environment that includes one or more objects, according to an example embodiment. The vehicle 800 may be similar to the vehicle 100. For example, as shown, the vehicle 800 includes sensor units 802, 806, 808, and 810 that are similar, respectively, to the sensor units 102, 106, 108, and 110 of the vehicle 100. For instance, the sensor unit 802 may include a first LIDAR (not shown) and a second LIDAR (not shown) that are similar, respectively, to the first LIDAR 120 and the second LIDAR 122 of the vehicle 100. Further, for instance, each of the sensor units 806-810 may also include a LIDAR similar to the third LIDAR 130 of the vehicle 100. As shown, the environment of the vehicle 800 includes various objects such as cars 812, 814, 816, road sign 818, tree 820, building 822, street sign 824, pedestrian 826, dog 828, car 830, driveway 832, and lane lines including lane line 834. In accordance with the present disclosure, the vehicle 800 may perform the methods and processes herein, such as methods 500-700, to facilitate autonomous operation of the vehicle 800 and/or accidence avoidance by the vehicle 800. Below are example scenarios for operation of the vehicle 800 in accordance with the present disclosure.

In a first scenario, the vehicle 800 may utilize the method 500 and/or 600 to detect and/or identify the various objects illustrated in FIG. 8. In the first scenario, the vehicle 800 may identify the cars 812-816 as moving objects that may be pertinent to navigational behavior of the vehicle 800. For instance, the vehicle 800 may utilize the various scanning resolutions and ranges of the respective LIDARs to properly identify the cars 812-816 as moving vehicles. Further, in the first scenario, the vehicle 800 may utilize the method 700 to track the cars 812-816 and facilitate such navigation. For instance, the vehicle 800 may adjust its speed, or may change lanes to avoid contact with the cars 812-816 based on data from the various LIDARs in the sensor units 802-810.

In a second scenario, the vehicle 800 may utilize a LIDAR of the sensor unit 808 and/or 806 to detect, identify, and/or track the car 812 that is in close proximity to the vehicle 800. Such LIDAR, for example, may be similar to the third LIDAR 130 of the vehicle 100 that is suitable for scanning the environment for objects within a short range of distances to the vehicle 800 due to the positioning of such LIDAR (e.g., in the sensor units 808 and/or 810). In contrast, for example, LIDARs in the sensor unit 802 may be less suitable for scanning the environment for the car 812 due to the positioning of such LIDARs at a top side of the vehicle 800 as shown in FIG. 8. For instance, the car 812 may be included at least partially within a region of the environment unscanned by the top-mounted LIDARs similar to the region illustrated by contour 160 in FIG. 1E.

In a third scenario, the vehicle 800 may utilize a first LIDAR of the sensor unit 802, similar to the LIDAR 120 of the vehicle 100, to detect and/or identify the car 814 that is within a threshold distance (e.g., medium range of distances) to the vehicle 800. In the scenario, the car 814 may be in the process of changing lanes to the same lane as the vehicle 800. In the scenario, the vehicle 800 may need to adjust its speed and/or change lanes to maintain a safe distance to the car 814. However, data from the first LIDAR may have a first resolution insufficient to detect whether the car 814 is crossing the lane line 834, or may be insufficient to even detect/identify the lane line 834. Thus, in the scenario, the vehicle 800 may adjust a viewing direction of a second LIDAR, similar to the second LIDAR 122 of the vehicle 100, that is included in the sensor unit 802 and that has a higher second resolution than the first resolution of the first LIDAR. In turn, the vehicle 800 may resolve the lane line 834 and/or whether the car 814 is crossing the lane lines. Alternatively, for instance, the vehicle 800 may utilize the higher resolution of the second LIDAR to detect a left light signal of the car 814 to determine that the vehicle 814 is changing lanes among other possibilities.

In a fourth scenario, the car 816 may be driving erratically or moving at a high speed relative to the vehicle 800 among other possibilities. In this scenario, the vehicle 800 may track the car 816 using the method 700, and may navigate accordingly (e.g., change lanes, adjust speed, etc.) to avoid contact with the car 816.

In a fifth scenario, the vehicle 800 may detect the road sign 818 using a medium range LIDAR, similar to the first LIDAR 120 of the vehicle 100. In turn, the vehicle 800 may adjust a viewing direction of a higher resolution LIDAR and/or longer range LIDAR, similar to the second LIDAR 122 of the vehicle 100, to analyze the road sign 818 for information. The higher resolution of the second LIDAR, for instance, may allow resolving the information due to differences of reflectivity of features in the road sign 818. In one instance of the scenario, the road sign may indicate hazards ahead or a closed lane, and the vehicle 800 may adjust its speed or change lanes accordingly. In another instance of the scenario, the road sign may indicate traffic delays ahead, and the vehicle 800 may then instruct a navigation system of the vehicle 800 to determine an alternate route. Other variations of the scenario are possible as well.

In a sixth scenario, the vehicle may utilizes methods 500 and/or 600 to scan the environment for roadside objects such as the tree 820, the building 822, the street sign 824, the pedestrian 826, the dog 828, the car 830, and/or the driveway 832. By utilizing the various properties of the various LIDARs in the sensor units 802-810 in line with the present disclosure (e.g., resolution, range, etc.), the vehicle 800 in the scenario may identify the objects 820, 822, and 824 as inanimate objects and may thus allow the vehicle 800 to change lanes into the lane adjacent to the inanimate objects.

As a variation of the scenario above, where the objects are animate objects such as the pedestrian 826 or the dog 828, the vehicle 800 may avoid the right lane in anticipation of an event where the animate objects move. Further, the vehicle 800 in the scenario may adjust a viewing direction of a high resolution LIDAR (e.g., second LIDAR 122, etc.) and/or obtain data from a LIDAR of the sensor unit 808 to identify and/or track such animate objects in line with the methods 500-700.

In some variations of the scenario above, the vehicle 800 may avoid the right lane even when the objects are inanimate. In one example, the vehicle 800 may determine that the street sign 824 is a bus stop sign, and may thereby avoid the right lane to allow room for a bus. In another example, the vehicle 800 may determine that the car 830 is moving out of the driveway 832, and may thereby navigate accordingly to allow room for the car 830.

In a seventh scenario, the vehicle 800 may utilize data from LIDARs in the sensor units 802-810 to determine a state of the vehicle 800. In the scenario, for instance, a door, hood, or bumper of the vehicle 800 may be open or ajar. In the scenario, the data from LIDARs in the sensor units 802-810 may indicate that such component of the vehicle 800 is open or ajar. For instance, the LIDAR in the sensor unit 808 may be configured to have a 270-degree FOV. In this instance, the LIDAR may not scan components of the vehicle 800 such as the hood. Thus, in the event that the hood of the vehicle 800 appears in the scan of the environment by the LIDAR of the sensor unit 808, the vehicle 800 may determine that the right door where the sensor unit 808 is mounted may be open or ajar.

Other scenarios are possible as well. Thus, the present methods and systems may facilitate autonomous operation and/or accidence avoidance for a vehicle such as the vehicle 800 by utilizing multiple LIDARs that have characteristics and positions around the vehicle in line with the exemplary embodiments herein.

Figure 9:
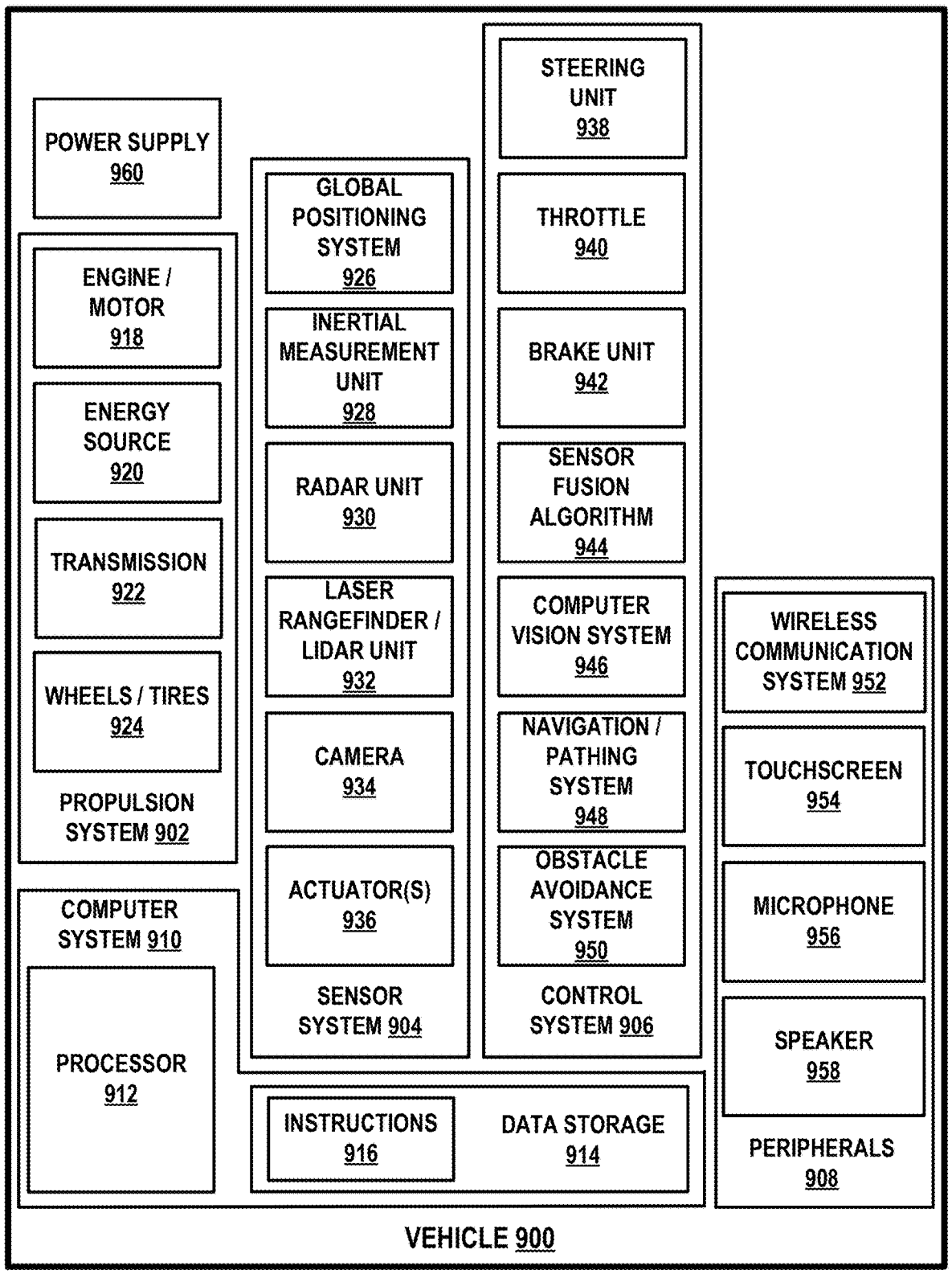
FIG. 9 is a simplified block diagram of a vehicle, according to an example embodiment.

FIG. 9 is a simplified block diagram of a vehicle 900, according to an example embodiment. The vehicle 900 may be similar to the vehicles 100 and/or 800, and may include multiple LIDARs similar to the LIDARs 200, 300, and/or 400. Further, the vehicle 900 may be configured to perform functions and methods herein such as the methods 500, 600, and/or 700. As shown, the vehicle 900 includes a propulsion system 902, a sensor system 904, a control system 906, peripherals 908, and a computer system 910. In other embodiments, the vehicle 900 may include more, fewer, or different systems, and each system may include more, fewer, or different components. Additionally, the systems and components shown may be combined or divided in any number of ways.

The propulsion system 902 may be configured to provide powered motion for the vehicle 900. As shown, the propulsion system 902 includes an engine/motor 918, an energy source 920, a transmission 922, and wheels/tires 924.

The engine/motor 918 may be or include any combination of an internal combustion engine, an electric motor, a steam engine, and a Stirling engine. Other motors and engines are possible as well. In some embodiments, the propulsion system 902 may include multiple types of engines and/or motors. For instance, a gas-electric hybrid car may include a gasoline engine and an electric motor. Other examples are possible.

The energy source 920 may be a source of energy that powers the engine/motor 918 in full or in part. That is, the engine/motor 918 may be configured to convert the energy source 920 into mechanical energy. Examples of energy sources 920 include gasoline, diesel, propane, other compressed gas-based fuels, ethanol, solar panels, batteries, and other sources of electrical power. The energy source(s) 920 may additionally or alternatively include any combination of fuel tanks, batteries, capacitors, and/or flywheels. In some embodiments, the energy source 920 may provide energy for other systems of the vehicle 900 as well.

The transmission 922 may be configured to transmit mechanical power from the engine/motor 918 to the wheels/tires 924. To this end, the transmission 922 may include a gearbox, clutch, differential, drive shafts, and/or other elements. In embodiments where the transmission 922 includes drive shafts, the drive shafts may include one or more axles that are configured to be coupled to the wheels/tires 924.

The wheels/tires 924 of vehicle 900 may be configured in various formats, including a unicycle, bicycle/motorcycle, tricycle, or car/truck four-wheel format. Other wheel/tire formats are possible as well, such as those including six or more wheels. In any case, the wheels/tires 924 may be configured to rotate differentially with respect to other wheels/tires 924. In some embodiments, the wheels/tires 924 may include at least one wheel that is fixedly attached to the transmission 922 and at least one tire coupled to a rim of the wheel that could make contact with the driving surface. The wheels/tires 924 may include any combination of metal and rubber, or combination of other materials. The propulsion system 902 may additionally or alternatively include components other than those shown.

The sensor system 904 may include a number of sensors configured to sense information about an environment in which the vehicle 900 is located, as well as one or more actuators 936 configured to modify a position and/or orientation of the sensors. As shown, the sensors of the sensor system 904 include a Global Positioning System (GPS) 926, an inertial measurement unit (IMU) 928, a RADAR unit 930, a laser rangefinder and/or LIDAR unit 932, and a camera 934. The sensor system 904 may include additional sensors as well, including, for example, sensors that monitor internal systems of the vehicle 900 (e.g., an 02 monitor, a fuel gauge, an engine oil temperature, etc.). Further, the sensor system 904 may include multiple LIDARs. In some examples, the sensor system 904 may be implemented as multiple sensor units each mounted to the vehicle in a respective position (e.g., top side, bottom side, front side, back side, right side, left side, etc.). Other sensors are possible as well.

The GPS 926 may be any sensor (e.g., location sensor) configured to estimate a geographic location of the vehicle 900. To this end, the GPS 926 may include a transceiver configured to estimate a position of the vehicle 900 with respect to the Earth. The GPS 926 may take other forms as well.

The IMU 928 may be any combination of sensors configured to sense position and orientation changes of the vehicle 900 based on inertial acceleration. In some embodiments, the combination of sensors may include, for example, accelerometers and gyroscopes. Other combinations of sensors are possible as well.

The RADAR unit 930 may be any sensor configured to sense objects in the environment in which the vehicle 900 is located using radio signals. In some embodiments, in addition to sensing the objects, the RADAR unit 930 may additionally be configured to sense the speed and/or heading of the objects.

Similarly, the laser range finder or LIDAR unit 932 may be any sensor configured to sense objects in the environment in which the vehicle 900 is located using lasers. In particular, the laser rangefinder or LIDAR unit 932 may include a laser source and/or laser scanner configured to emit a laser and a detector configured to detect reflections of the laser. The laser rangefinder or LIDAR 932 may be configured to operate in a coherent (e.g., using heterodyne detection) or an incoherent detection mode. In some examples, the LIDAR unit 932 may include multiple LIDARs that each have a unique position and/or configuration suitable for scanning a particular region of an environment around the vehicle 900.

The camera 934 may be any camera (e.g., a still camera, a video camera, etc.) configured to capture images of the environment in which the vehicle 900 is located. To this end, the camera may take any of the forms described above. The sensor system 904 may additionally or alternatively include components other than those shown.

The control system 906 may be configured to control operation of the vehicle 900 and its components. To this end, the control system 906 may include a steering unit 938, a throttle 940, a brake unit 942, a sensor fusion algorithm 944, a computer vision system 946, a navigation or pathing system 948, and an obstacle avoidance system 950.

The steering unit 938 may be any combination of mechanisms configured to adjust the heading of vehicle 900. The throttle 940 may be any combination of mechanisms configured to control the operating speed of the engine/motor 918 and, in turn, the speed of the vehicle 900. The brake unit 942 may be any combination of mechanisms configured to decelerate the vehicle 900. For example, the brake unit 942 may use friction to slow the wheels/tires 924. As another example, the brake unit 942 may convert the kinetic energy of the wheels/tires 924 to electric current. The brake unit 942 may take other forms as well.

The sensor fusion algorithm 944 may be an algorithm (or a computer program product storing an algorithm) configured to accept data from the sensor system 904 as an input. The data may include, for example, data representing information sensed at the sensors of the sensor system 904. The sensor fusion algorithm 944 may include, for example, a Kalman filter, a Bayesian network, an algorithm for some of the functions of the methods herein, or any another algorithm. The sensor fusion algorithm 944 may further be configured to provide various assessments based on the data from the sensor system 904, including, for example, evaluations of individual objects and/or features in the environment in which the vehicle 100 is located, evaluations of particular situations, and/or evaluations of possible impacts based on particular situations. Other assessments are possible as well.

The computer vision system 946 may be any system configured to process and analyze images captured by the camera 934 in order to identify objects and/or features in the environment in which the vehicle 900 is located, including, for example, traffic signals and obstacles. To this end, the computer vision system 946 may use an object recognition algorithm, a Structure from Motion (SFM) algorithm, video tracking, or other computer vision techniques. In some embodiments, the computer vision system 946 may additionally be configured to map the environment, track objects, estimate the speed of objects, etc.

The navigation and pathing system 948 may be any system configured to determine a driving path for the vehicle 900. The navigation and pathing system 948 may additionally be configured to update the driving path dynamically while the vehicle 900 is in operation. In some embodiments, the navigation and pathing system 948 may be configured to incorporate data from the sensor fusion algorithm 944, the GPS 926, the LIDAR unit 932, and one or more predetermined maps so as to determine the driving path for vehicle 900.

The obstacle avoidance system 950 may be any system configured to identify, evaluate, and avoid or otherwise negotiate obstacles in the environment in which the vehicle 900 is located. The control system 906 may additionally or alternatively include components other than those shown.

Peripherals 908 may be configured to allow the vehicle 900 to interact with external sensors, other vehicles, external computing devices, and/or a user. To this end, the peripherals 908 may include, for example, a wireless communication system 952, a touchscreen 954, a microphone 956, and/or a speaker 958.

The wireless communication system 952 may be any system configured to wirelessly couple to one or more other vehicles, sensors, or other entities, either directly or via a communication network. To this end, the wireless communication system 952 may include an antenna and a chipset for communicating with the other vehicles, sensors, servers, or other entities either directly or via a communication network. The chipset or wireless communication system 952 in general may be arranged to communicate according to one or more types of wireless communication (e.g., protocols) such as Bluetooth, communication protocols described in IEEE 802.11 (including any IEEE 802.11 revisions), cellular technology (such as GSM, CDMA, UMTS, EV-DO, WiMAX, or LTE), Zigbee, dedicated short range communications (DSRC), and radio frequency identification (RFID) communications, among other possibilities. The wireless communication system 952 may take other forms as well.

The touchscreen 954 may be used by a user to input commands to the vehicle 900. To this end, the touchscreen 954 may be configured to sense at least one of a position and a movement of a user's finger via capacitive sensing, resistance sensing, or a surface acoustic wave process, among other possibilities. The touchscreen 954 may be capable of sensing finger movement in a direction parallel or planar to the touchscreen surface, in a direction normal to the touchscreen surface, or both, and may also be capable of sensing a level of pressure applied to the touchscreen surface. The touchscreen 954 may be formed of one or more translucent or transparent insulating layers and one or more translucent or transparent conducting layers. The touchscreen 954 may take other forms as well.

The microphone 956 may be configured to receive audio (e.g., a voice command or other audio input) from a user of the vehicle 900. Similarly, the speakers 958 may be configured to output audio to the user of the vehicle 900. The peripherals 908 may additionally or alternatively include components other than those shown.

The computer system 910 may be configured to transmit data to, receive data from, interact with, and/or control one or more of the propulsion system 902, the sensor system 904, the control system 906, and the peripherals 908. To this end, the computer system 910 may be communicatively linked to one or more of the propulsion system 902, the sensor system 904, the control system 906, and the peripherals 908 by a system bus, network, and/or other connection mechanism (not shown).

In one example, the computer system 910 may be configured to control operation of the transmission 922 to improve fuel efficiency. As another example, the computer system 910 may be configured to cause the camera 934 to capture images of the environment. As yet another example, the computer system 910 may be configured to store and execute instructions corresponding to the sensor fusion algorithm 944. As still another example, the computer system 910 may be configured to store and execute instructions for determining a 3D representation of the environment around the vehicle 900 using the LIDAR unit 932. Other examples are possible as well.

As shown, the computer system 910 includes the processor 912 and data storage 914. The processor 912 may comprise one or more general-purpose processors and/or one or more special-purpose processors. To the extent the processor 912 includes more than one processor, such processors could work separately or in combination. Data storage 914, in turn, may comprise one or more volatile and/or one or more non-volatile storage components, such as optical, magnetic, and/or organic storage, and data storage 914 may be integrated in whole or in part with the processor 912.

In some embodiments, data storage 914 may contain instructions 916 (e.g., program logic) executable by the processor 912 to execute various vehicle functions (e.g., methods 500-700, etc.). Data storage 914 may contain additional instructions as well, including instructions to transmit data to, receive data from, interact with, and/or control one or more of the propulsion system 902, the sensor system 904, the control system 906, and/or the peripherals 908. The computer system 910 may additionally or alternatively include components other than those shown.

As shown, the vehicle 900 further includes a power supply 960, which may be configured to provide power to some or all of the components of the vehicle 900. To this end, the power supply 960 may include, for example, a rechargeable lithium-ion or lead-acid battery. In some embodiments, one or more banks of batteries could be configured to provide electrical power. Other power supply materials and configurations are possible as well. In some embodiments, the power supply 960 and energy source 920 may be implemented together as one component, as in some all-electric cars.

In some embodiments, the vehicle 900 may include one or more elements in addition to or instead of those shown. For example, the vehicle 900 may include one or more additional interfaces and/or power supplies. Other additional components are possible as well. In such embodiments, data storage 914 may further include instructions executable by the processor 912 to control and/or communicate with the additional components.

Still further, while each of the components and systems are shown to be integrated in the vehicle 900, in some embodiments, one or more components or systems may be removably mounted on or otherwise connected (mechanically or electrically) to the vehicle 900 using wired or wireless connections. The vehicle 900 may take other forms as well.

Figure 10:
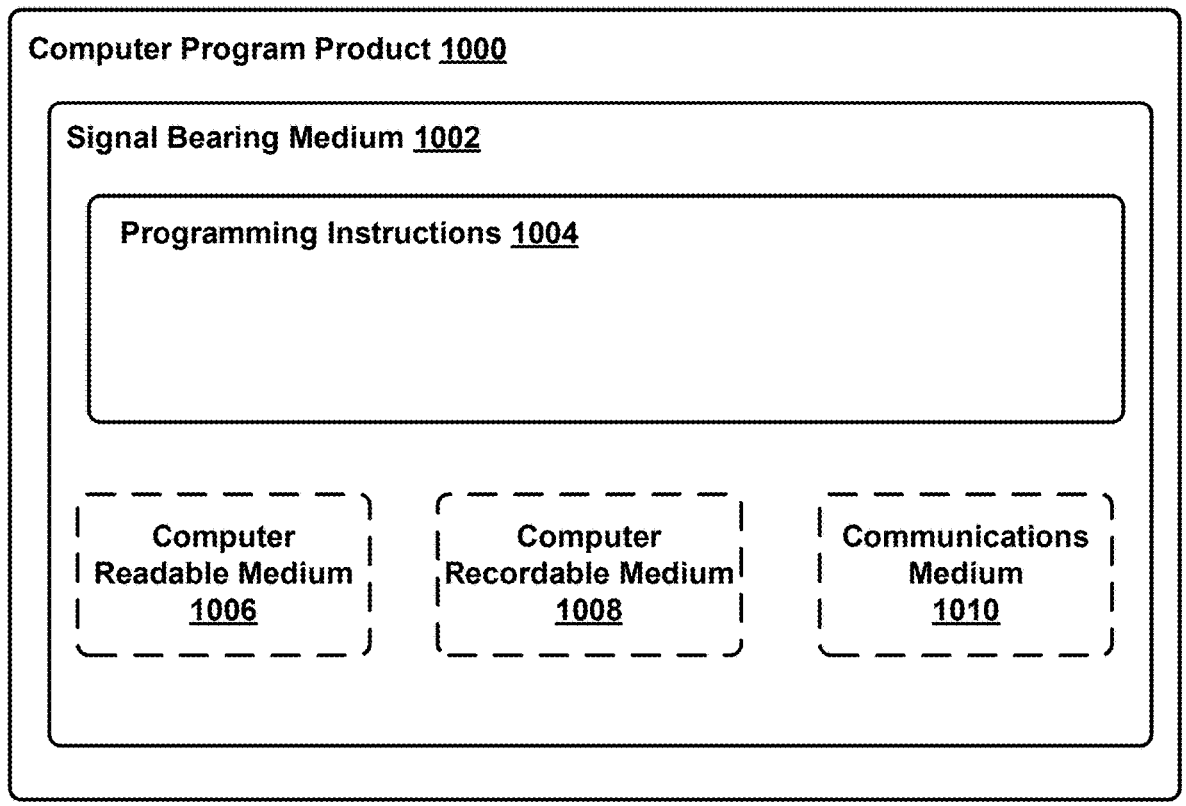
FIG. 10 depicts a computer readable medium configured according to an example embodiment.

FIG. 10 depicts a computer readable medium configured according to an example embodiment. In example embodiments, an example system may include one or more processors, one or more forms of memory, one or more input devices/interfaces, one or more output devices/interfaces, and machine readable instructions that when executed by the one or more processors cause the system to carry out the various functions tasks, capabilities, etc., described above.

As noted above, in some embodiments, the disclosed techniques (e.g., methods 500, 600, 700, etc.) may be implemented by computer program instructions encoded on a computer readable storage media in a machine-readable format, or on other media or articles of manufacture (e.g., instructions 916 of the vehicle 900, etc.). FIG. 10 is a schematic illustrating a conceptual partial view of an example computer program product that includes a computer program for executing a computer process on a computing device, arranged according to at least some embodiments disclosed herein.

In one embodiment, the example computer program product 1000 is provided using a signal bearing medium 1002. The signal bearing medium 1002 may include one or more programming instructions 1004 that, when executed by one or more processors may provide functionality or portions of the functionality described above with respect to FIGS. 1-9. In some examples, the signal bearing medium 1002 may be a non-transitory computer-readable medium 1006, such as, but not limited to, a hard disk drive, a Compact Disc (CD), a Digital Video Disk (DVD), a digital tape, memory, etc. In some implementations, the signal bearing medium 1002 may be a computer recordable medium 1008, such as, but not limited to, memory, read/write (R/W) CDs, R/W DVDs, etc. In some implementations, the signal bearing medium 1002 may be a communication medium 1010 (e.g., a fiber optic cable, a waveguide, a wired communications link, etc.). Thus, for example, the signal bearing medium 1002 may be conveyed by a wireless form of the communications medium 1010.

The one or more programming instructions 1004 may be, for example, computer executable and/or logic implemented instructions. In some examples, a computing device may be configured to provide various operations, functions, or actions in response to the programming instructions 1004 conveyed to the computing device by one or more of the computer readable medium 1006, the computer recordable medium 1008, and/or the communications medium 1010.

The computer readable medium 1006 may also be distributed among multiple data storage elements, which could be remotely located from each other. The computing device that executes some or all of the stored instructions could be an external computer, or a mobile computing platform, such as a smartphone, tablet device, personal computer, wearable device, etc. Alternatively, the computing device that executes some or all of the stored instructions could be remotely located computer system, such as a server.

It should be understood that arrangements described herein are for purposes of example only. As such, those skilled in the art will appreciate that other arrangements and other elements (e.g. machines, interfaces, functions, orders, and groupings of functions, etc.) can be used instead, and some elements may be omitted altogether according to the desired results. Further, many of the elements that are described are functional entities that may be implemented as discrete or distributed components or in conjunction with other components, in any suitable combination and location, or other structural elements described as independent structures may be combined.

While various aspects and embodiments have been disclosed herein, other aspects and embodiments will be apparent to those skilled in the art. The various aspects and embodiments disclosed herein are for purposes of illustration and are not intended to be limiting, with the true scope being indicated by the following claims, along with the full scope of equivalents to which such claims are entitled. It is also to be understood that the terminology used herein is for the purpose of describing particular embodiments only, and is not intended to be limiting.

What is claimed is:

1. A sensor assembly comprising:
   a first module including:
      a first light filter along an external surface of the first module;
      a first light detection and ranging device (lidar) unit disposed within the first module, the first lidar unit having a first field of view, the first lidar unit being configured to detect objects in an external environment of a vehicle based on the first field of view;
      a first dividing structure disposed within the first module, the first dividing structure supporting the first lidar unit within the first module; and
      a first set of one or more cameras, the first set of cameras being configured to detect objects in the external environment of the vehicle,
      wherein the dividing structure separates the first lidar unit from the first set of cameras; and
   a second module including:
      a second light filter along an external surface of the second module; and
      a second lidar unit disposed within the second module, the second lidar unit having a second field of view different from the first field of view, the second lidar unit being configured to detect objects in the external environment of the vehicle based on the second field of view.

2. The sensor assembly of claim 1, wherein the first module is a first dome module and the second module is a second dome module.

3. The sensor assembly of claim 2, wherein the first set of one or more cameras is disposed within the first dome module.

4. The sensor assembly of claim 1, wherein the second module is positioned adjacent to the first module at the top side of the vehicle.

5. The sensor assembly of claim 1, wherein the second module further includes:
   a second dividing structure disposed within the second module, the second dividing structure supporting the second lidar unit within the second module; and
   a second set of one or more cameras, the second set of cameras being configured to detect objects in the external environment of the vehicle,
   wherein the second dividing structure separates the second lidar unit from the second set of cameras.

6. The sensor assembly of claim 1, wherein a portion of the first light filter is shaped to enclose the first lidar unit, and a portion of the second light filter is shaped to enclose the second lidar unit.

7. The sensor assembly of claim 1, wherein the sensor assembly further includes a third lidar unit disposed adjacent to the first module and a fourth lidar unit disposed adjacent to the second module.

8. The sensor assembly of claim 7, wherein the first and second lidar units each has a first refresh rate and the third and fourth lidar units each has a second refresh rate different from the first refresh rate.

9. The sensor assembly of claim 7, wherein the first and second lidar units each has a first angular resolution and the third and fourth lidar units each has a second angular resolution different from the first angular resolution.

10. The sensor assembly of claim 7, wherein the first and second lidar units each has a first range and the third and fourth lidar units each has a second range different from the first range.

11. The sensor assembly of claim 1, wherein a housing of the first module and a housing of the second module each has a substantially cylindrical shape.

12. The sensor assembly of claim 1, wherein the sensor assembly is configured for connection to a roof section along the top side of the vehicle.

13. A vehicle capable of operating in an autonomous mode along a driving surface, the vehicle comprising:
   a sensor assembly connected to a top side of the vehicle, the sensor assembly having:
      a first module including:
         a first light filter along an external surface of the first module;
         a first light detection and ranging device (lidar) unit disposed within the first module, the first lidar unit having a first field of view, the first lidar unit being configured to detect objects in an external environment of a vehicle based on the first field of view;
         a first dividing structure disposed within the first module, the first dividing structure supporting the first lidar unit within the first module; and
         a first set of one or more cameras, the first set of cameras being configured to detect objects in the external environment of the vehicle, wherein the dividing structure separates the first lidar unit from the first set of cameras; and
      a second module including:
         a second light filter along an external surface of the second module; and
         a second lidar unit disposed within the second module, the second lidar unit having a second field of view different from the first field of view, the second lidar unit being configured to detect objects in the external environment of the vehicle based on the second field of view;
   one or more wheels disposed along a bottom side of the vehicle opposite the top side, the one or more wheels configured to rotate to cause the vehicle to travel along the driving surface; and
   a control system configured to control operation of the one or more wheels based at least in part on data from the first and second lidar units.

14. The vehicle of claim 13, further comprising:
another sensor assembly having a third lidar unit, the other sensor assembly being disposed along a perimeter of the vehicle adjacent to one of a door of the vehicle, a quarterpanel of the vehicle, a front bumper of the vehicle, or a rear side of the vehicle.

15. The vehicle of claim 14, wherein the third lidar unit is configured to provide a field of view along the perimeter of the vehicle.

16. The vehicle of claim 15, wherein the field of view along the perimeter of the vehicle is not encompassed by a field of view of the first and second lidar units.

17. The vehicle of claim 13, wherein the vehicle is either a truck or a semi-trailer truck.

18. A system comprising:
a first set of light-emitter devices that emit pulses according to a first arrangement;
a second set of light-emitter devices that emit light pulses according to a second arrangement, wherein the first arrangement and the second arrangement provide different resolutions;
a first set of light-detecting devices configured to detect at least a portion of the light pulses emitted according to the first arrangement so as to provide first reflected light data;
a second set of light-detecting devices configured to detect at least a portion of the light pulses emitted according to the second arrangement so as to provide second reflected light data; and
a computing device operable to form point cloud data based on the first reflected light data and the second reflected light data.

19. The system of claim 18, further comprising:
a housing configured to rotate about a rotational axis;
a transmit assembly coupled to the housing, the transmit assembly comprising the first set of light-emitter devices and the second set of light-emitter devices, wherein the first and second sets of light-emitter devices are operable to emit light pulses, wherein a portion of the light pulses interact with an environment of the system to provide reflected light pulses; and
a receive assembly coupled to the housing, the receive assembly comprising the first set of light-detecting devices and the second set of light-detecting devices, wherein the first and second sets of light-detecting devices are operable to detect the reflected light pulses,
wherein the computing device comprises at least one processor and a memory, the at least one processor being configured to execute program instructions stored in the memory so as to carry out operations, the operations comprising:
to cause, during a first time period, the first set of light-emitter devices to emit light pulses into the environment according to the first arrangement; and
to cause, during a second time period, the second set of light-emitter devices to emit light pulses into the environment according to the second arrangement.

20. The system of claim 19, wherein a combination of the first set of light-emitter devices and the second set of light-emitter devices comprises at least 64 light-emitter devices, and wherein a combination of the first set of light-detecting devices and the second set of light-detecting devices comprises at least 256 light-detecting devices.

21. The system of claim 20, wherein:
to cause the first set of light-emitter devices to emit light pulses into the environment comprises a first scan;
to cause the second set of light-emitter devices to emit light pulses into the environment comprises a second scan;
and the first scan is used to obtain higher resolution data than the second scan.

22. The system of claim 19, wherein the operations further comprise:
to determine a region of interest in the environment;
in response to a determination of the region of interest, to determine a desired arrangement; and
to cause at least one of the first set of light-emitter devices or the second set of light-emitter devices to emit light pulses into the region of interest in the environment according to the desired arrangement.

23. The system of claim 19, wherein the operations further comprise:
during the first time period, operating the light-emitter devices and light-detecting devices at a first wavelength range; and
during the second time period, operating the light-emitter devices and light-detecting devices at a second wavelength range, wherein the second wavelength range is different than the first wavelength range.

* * * * *